US010679260B2

(12) United States Patent
Chittilappilly et al.

(10) Patent No.: US 10,679,260 B2
(45) Date of Patent: Jun. 9, 2020

(54) CROSS-DEVICE MESSAGE TOUCHPOINT ATTRIBUTION

(71) Applicant: Visual IQ, INC., Needham, MA (US)

(72) Inventors: Anto Chittilappilly, Waltham, MA (US); Parameshvyas Laxminarayan, Needham, MA (US); Payman Sadegh, Alpharetta, GA (US); Philip Gross, Newton, MA (US)

(73) Assignee: VISUAL IQ, INC., Needham, MA (US)

( * ) Notice: Subject to any disclaimer, the term of this patent is extended or adjusted under 35 U.S.C. 154(b) by 310 days.

(21) Appl. No.: 15/490,757

(22) Filed: Apr. 18, 2017

(65) Prior Publication Data

US 2017/0337588 A1 Nov. 23, 2017

Related U.S. Application Data

(60) Provisional application No. 62/324,787, filed on Apr. 19, 2016.

(51) Int. Cl.
G06Q 30/00 (2012.01)
G06Q 30/02 (2012.01)
(Continued)

(52) U.S. Cl.
CPC ......... G06Q 30/0277 (2013.01); G06N 5/022 (2013.01); G06N 7/005 (2013.01); G06Q 30/0244 (2013.01); *G06N 20/00* (2019.01)

(58) Field of Classification Search
CPC . G06Q 30/0277; G06Q 30/0269; G06Q 30/02
(Continued)

(56) References Cited

U.S. PATENT DOCUMENTS 5,517,425 A * 5/1996 Fujitani ............... G01N 7/16
702/22
6,286,005 B1 * 9/2001 Cannon .............. G06Q 30/02
455/2.01

(Continued)

OTHER PUBLICATIONS

Kemelor; Digital Data Grows Into Big Data; IT Pro Jul./Aug. 2015; pp. 42-48; 2015.*

(Continued)

Primary Examiner — Radu Andrei
(74) Attorney, Agent, or Firm — Hanley, Flight & Zimmerman, LLC

(57) ABSTRACT

Fragmented user engagement stacks are generated from users that use multiple devices to view messages. The fragmented user engagement stacks include a universal unique identifier (UUID). A computer platform stores cross-device mapping information, derived from a shared characteristic between two or more devices, that associates the UUIDs of multiple devices to a single user. The computer platform processes the cross-device mapping data to identify the UUIDs from different devices associated with a single user and to join touchpoint encounters from the single user to generate at least one cross-device user engagement stack. The computer platform uses the cross-device user engagement stack and the response data to determine attribution as a measure of influence attributed to touchpoint encounters from a single user.

20 Claims, 16 Drawing Sheets

(51) Int. Cl.
  *G06N 5/02* (2006.01)
  *G06N 7/00* (2006.01)
  *G06N 20/00* (2019.01)
(58) Field of Classification Search
  USPC .......................................... 705/14.45, 14.49
  See application file for complete search history.

(56) References Cited

U.S. PATENT DOCUMENTS

| | | | |
|---|---|---|---|
| 7,370,003 | B2 | 5/2008 | Pych |
| 7,949,561 | B2 | 5/2011 | Briggs |
| 8,103,663 | B2 | 1/2012 | Nishida |
| 8,244,571 | B2 | 8/2012 | Cavander |
| 8,321,273 | B2 | 11/2012 | Briggs |
| 8,417,560 | B2 | 4/2013 | Woods |
| 8,423,406 | B2 | 4/2013 | Briggs |
| 8,423,539 | B2 | 4/2013 | Nishida |
| 8,468,045 | B2 | 6/2013 | Cavander |
| 8,473,343 | B2 | 6/2013 | Chalimadugu |
| 8,533,825 | B1 | 9/2013 | Marsa |
| 8,561,184 | B1 | 10/2013 | Marsa |
| 8,676,647 | B2 | 3/2014 | Crites |
| 8,738,440 | B2 | 5/2014 | Crites |
| 8,762,874 | B2 | 6/2014 | Hong |
| 8,768,943 | B2 | 7/2014 | Puttaswamy |
| 8,775,248 | B1 | 7/2014 | Saldanha |
| 8,788,339 | B2 | 7/2014 | Hughes |
| 8,862,498 | B2 | 10/2014 | Crites |
| 9,183,562 | B2 | 11/2015 | Chittilappilly |
| 2006/0134311 | A1* | 6/2006 | Mueller .................. A23G 3/42 426/660 |
| 2007/0282859 | A1 | 12/2007 | Charvet |
| 2008/0046267 | A1* | 2/2008 | Romano ................ G06Q 10/06 705/1.1 |
| 2008/0162281 | A1 | 7/2008 | Davis |
| 2008/0235073 | A1 | 9/2008 | Cavander |
| 2009/0089152 | A1 | 4/2009 | Davis |
| 2009/0144117 | A1 | 6/2009 | Cavander |
| 2009/0216597 | A1* | 8/2009 | Cavander .............. G06Q 10/00 705/7.12 |
| 2009/0259518 | A1* | 10/2009 | Harvey ............. G06Q 10/0639 705/7.29 |
| 2009/0315911 | A1* | 12/2009 | Ohnishi ................ G06T 11/001 345/593 |
| 2010/0036700 | A1 | 2/2010 | Cavander |
| 2010/0036722 | A1 | 2/2010 | Cavander |
| 2010/0042387 | A1 | 2/2010 | Gibbon |
| 2010/0042477 | A1 | 2/2010 | Cavander |
| 2010/0145793 | A1* | 6/2010 | Cavander .............. G06Q 10/04 705/14.42 |
| 2010/0161492 | A1 | 6/2010 | Harvey ............. G06Q 10/0639 705/50 |
| 2010/0198772 | A1* | 8/2010 | Silverman ............. G06Q 30/02 706/52 |
| 2010/0332311 | A1 | 12/2010 | Jilk |
| 2011/0010211 | A1 | 1/2011 | Cavander |
| 2011/0173047 | A1 | 7/2011 | Kelley |
| 2011/0173063 | A1* | 7/2011 | Bhatia .................. G06Q 30/02 705/14.45 |
| 2011/0307509 | A1 | 12/2011 | Hsiao |
| 2012/0029987 | A1 | 2/2012 | Kusumoto |
| 2012/0109882 | A1 | 5/2012 | Bouse |
| 2012/0290371 | A1 | 11/2012 | Crites |
| 2012/0290373 | A1 | 11/2012 | Ferzacca |
| 2013/0035975 | A1 | 2/2013 | Cavander |
| 2013/0124302 | A1 | 5/2013 | Briggs |
| 2013/0166364 | A1 | 6/2013 | Kusumoto |
| 2013/0211910 | A1 | 8/2013 | Yerli |
| 2013/0231977 | A1* | 9/2013 | Synett ...................... G06N 5/02 705/7.35 |
| 2013/0332223 | A1 | 12/2013 | Cavander |
| 2013/0346185 | A1 | 12/2013 | Chalimadugu |
| 2014/0058827 | A1* | 2/2014 | Svirsky ................. G06Q 30/02 705/14.43 |
| 2014/0067518 | A1 | 3/2014 | Mcgovern |
| 2014/0074587 | A1 | 3/2014 | Briggs |
| 2014/0081740 | A1 | 3/2014 | Lipka |
| 2014/0188596 | A1 | 7/2014 | Nangle, III |
| 2014/0188597 | A1 | 7/2014 | Nangle, III |
| 2014/0195339 | A1 | 7/2014 | Paulsen |
| 2014/0244345 | A1 | 8/2014 | Sollis |
| 2014/0244380 | A1 | 8/2014 | Willeitner |
| 2014/0257966 | A1 | 9/2014 | Chittilappilly |
| 2014/0257972 | A1 | 9/2014 | Chittilappilly |
| 2014/0278620 | A1 | 9/2014 | Khan |
| 2014/0278622 | A1 | 9/2014 | Chen |
| 2014/0279045 | A1* | 9/2014 | Shottan .............. G06Q 30/0269 705/14.66 |
| 2014/0279057 | A1* | 9/2014 | Shepherd ........... G06Q 30/0276 705/14.72 |
| 2014/0324567 | A1 | 10/2014 | Saldanha |
| 2014/0379490 | A1 | 12/2014 | Schnabl |
| 2015/0006296 | A1* | 1/2015 | Gupta ................ G06Q 30/0269 705/14.66 |
| 2015/0161662 | A1* | 6/2015 | Minor ................ G06Q 30/0249 705/14.48 |
| 2015/0220971 | A1 | 8/2015 | Raj |
| 2015/0235258 | A1* | 8/2015 | Shah .................. G06Q 30/0242 705/14.45 |
| 2015/0242494 | A1* | 8/2015 | Safaie ................. G06F 16/3326 707/749 |
| 2015/0317670 | A1* | 11/2015 | Cavander ........... G06Q 30/0242 705/14.41 |
| 2015/0356598 | A1 | 12/2015 | Cavander |
| 2015/0379556 | A1* | 12/2015 | Udassin ............. G06Q 30/0243 705/14.42 |
| 2016/0034948 | A1* | 2/2016 | Zhong ................ G06Q 30/0246 705/14.45 |
| 2016/0055519 | A1 | 2/2016 | Chittilappilly |
| 2016/0063427 | A1 | 3/2016 | Xu |
| 2016/0088340 | A1 | 3/2016 | Yabu |
| 2016/0092913 | A1 | 3/2016 | Crites |
| 2016/0098735 | A1 | 4/2016 | Sinha |
| 2016/0125467 | A1* | 5/2016 | Scott .................. G06Q 30/0261 705/14.58 |
| 2016/0125471 | A1* | 5/2016 | Hsu .................... G06Q 30/0269 705/14.66 |
| 2016/0139241 | A1* | 5/2016 | Holz .................... H04B 17/318 367/128 |
| 2016/0189205 | A1 | 6/2016 | Chittilappilly |
| 2016/0210656 | A1 | 7/2016 | Chittilappilly |
| 2016/0210658 | A1 | 7/2016 | Chittilappilly |
| 2016/0210661 | A1 | 7/2016 | Chittilappilly |
| 2017/0046734 | A1 | 2/2017 | Chittilappilly |
| 2017/0091810 | A1 | 3/2017 | McGovern |
| 2017/0139917 | A1* | 5/2017 | Owens .................... G06Q 50/01 |
| 2017/0224862 | A1* | 8/2017 | Ohr ........................ A61L 9/014 |

OTHER PUBLICATIONS

Soh; Technology-Mediated Learning; IEEE 2008; pp. 50-66; 2008.*
U.S. Appl. No. 15/491,903, Anto Chittilappilly.
U.S. Appl. No. 15/490,751, Anto Chittilappilly.
U.S. Appl. No. 15/491,908, Anto Chittilappilly.
United States Patent and Trademark Office, "Non-Final Rejection" Issued in connection with U.S. Appl. No. 13/492,493 dated Feb. 14, 2014. This reference is not provided as it is a USPTO paper. The Applicant will provide a copy to the Examiner upon request. (10 pages).
United States Patent and Trademark Office, "Final Rejection" Issued in connection with U.S. Appl. No. 13/492,493 dated Jun. 30, 2014. This reference is not provided as it is a USPTO paper. The Applicant will provide a copy to the Examiner upon request. (10 pages).
United States Patent and Trademark Office, "Non-Final Rejection" Issued in connection with U.S. Appl. No. 13/492,493 dated Mar. 6, 2015. This reference is not provided as it is a USPTO paper. The Applicant will provide a copy to the Examiner upon request. (14 pages).
United States Patent and Trademark Office, "Non-Final Rejection" Issued in connection with U.S. Appl. No. 13/789,453 dated Mar. 4,

(56) References Cited

OTHER PUBLICATIONS

2014. This reference is not provided as it is a USPTO paper. The Applicant will provide a copy to the Examiner upon request. (13 pages).
United States Patent and Trademark Office, "Final Rejection" Issued in connection with U.S. Appl. No. 13/789,453 dated Jun. 30, 2014. This reference is not provided as it is a USPTO paper. The Applicant will provide a copy to the Examiner upon request. (9 pages).
United States Patent and Trademark Office, "Non-Final Rejection" Issued in connection with U.S. Appl. No. 13/789,453 dated Mar. 20, 2015. This reference is not provided as it is a USPTO paper. The Applicant will provide a copy to the Examiner upon request. (13 pages).
United States Patent and Trademark Office, "Final Rejection" Issued in connection with U.S. Appl. No. 13/789,453 dated Aug. 14, 2015. This reference is not provided as it is a USPTO paper. The Applicant will provide a copy to the Examiner upon request. (18 pages).
United States Patent and Trademark Office, "Non-Final Rejection" Issued in connection with U.S. Appl. No. 13/789,453 dated Apr. 11, 2017. This reference is not provided as it is a USPTO paper. The Applicant will provide a copy to the Examiner upon request. (10 pages).
United States Patent and Trademark Office, "Final Rejection" Issued in connection with U.S. Appl. No. 13/789,453 dated Jan. 2, 2018. This reference is not provided as it is a USPTO paper. The Applicant will provide a copy to the Examiner upon request. (14 pages).
United States Patent and Trademark Office, "Non-Final Rejection" Issued in connection with U.S. Appl. No. 13/789,453 dated Sep. 14, 2018. This reference is not provided as it is a USPTO paper. The Applicant will provide a copy to the Examiner upon request. (16 pages).
United States Patent and Trademark Office, "Final Rejection" Issued in connection with U.S. Appl. No. 13/789,453 dated May 29, 2019. This reference is not provided as it is a USPTO paper. The Applicant will provide a copy to the Examiner upon request. (16 pages).
United States Patent and Trademark Office, "Non-Final Rejection" Issued in connection with U.S. Appl. No. 13/789,459 dated Nov. 11, 2014. This reference is not provided as it is a USPTO paper. The Applicant will provide a copy to the Examiner upon request. (12 pages).
United States Patent and Trademark Office, "Final Rejection" Issued in connection with U.S. Appl. No. 13/789,459 dated Jun. 24, 2015. This reference is not provided as it is a USPTO paper. The Applicant will provide a copy to the Examiner upon request. (17 pages).
United States Patent and Trademark Office, "Non-Final Rejection" Issued in connection with U.S. Appl. No. 13/789,459 dated Apr. 20, 2017. This reference is not provided as it is a USPTO paper. The Applicant will provide a copy to the Examiner upon request. (11 pages).
United States Patent and Trademark Office, "Final Rejection" Issued in connection with U.S. Appl. No. 13/789,459 dated Aug. 16, 2017. This reference is not provided as it is a USPTO paper. The Applicant will provide a copy to the Examiner upon request. (10 pages).
United States Patent and Trademark Office, "Non-Final Rejection" Issued in connection with U.S. Appl. No. 13/789,459 dated Sep. 13, 2018. This reference is not provided as it is a USPTO paper. The Applicant will provide a copy to the Examiner upon request. (15 pages).
United States Patent and Trademark Office, "Final Rejection" Issued in connection with U.S. Appl. No. 13/789,459 dated Jan. 17, 2019. This reference is not provided as it is a USPTO paper. The Applicant will provide a copy to the Examiner upon request. (20 pages).
United States Patent and Trademark Office, "Non-Final Rejection" Issued in connection with U.S. Appl. No. 14/145,521 dated Aug. 8, 2015. This reference is not provided as it is a USPTO paper. The Applicant will provide a copy to the Examiner upon request. (9 pages).
United States Patent and Trademark Office, "Final Rejection" Issued in connection with U.S. Appl. No. 14/145,521 dated Mar. 1, 2016. This reference is not provided as it is a USPTO paper. The Applicant will provide a copy to the Examiner upon request. (17 pages).
United States Patent and Trademark Office, "Non-Final Rejection" Issued in connection with U.S. Appl. No. 14/145,521 dated Apr. 25, 2017. This reference is not provided as it is a USPTO paper. The Applicant will provide a copy to the Examiner upon request. (16 pages).
United States Patent and Trademark Office, "Final Rejection" Issued in connection with U.S. Appl. No. 14/145,521 dated Dec. 13, 2017. This reference is not provided as it is a USPTO paper. The Applicant will provide a copy to the Examiner upon request. (18 pages).
United States Patent and Trademark Office, "Non-Final Rejection" Issued in connection with U.S. Appl. No. 14/145,521 dated Sep. 14, 2018. This reference is not provided as it is a USPTO paper. The Applicant will provide a copy to the Examiner upon request. (17 pages).
United States Patent and Trademark Office, "Final Rejection" Issued in connection with U.S. Appl. No. 14/145,521 dated Jan. , 2019. This reference is not provided as it is a USPTO paper. The Applicant will provide a copy to the Examiner upon request. (18 pages).
United States Patent and Trademark Office, "Non-Final Rejection" Issued in connection with U.S. Appl. No. 14/145,625 dated Oct. 7, 2016. This reference is not provided as it is a USPTO paper. The Applicant will provide a copy to the Examiner upon request. (10 pages).
United States Patent and Trademark Office, "Final Rejection" Issued in connection with U.S. Appl. No. 14/145,625 dated Feb. 23, 2017. This reference is not provided as it is a USPTO paper. The Applicant will provide a copy to the Examiner upon request. (14 pages).
United States Patent and Trademark Office, "Non-Final Rejection" Issued in connection with U.S. Appl. No. 14/322,353 dated Aug. 10, 2017. This reference is not provided as it is a USPTO paper. The Applicant will provide a copy to the Examiner upon request. (23 pages).
United States Patent and Trademark Office, "Final Rejection" Issued in connection with U.S. Appl. No. 14/322,353 dated Feb. 12, 2018. This reference is not provided as it is a USPTO paper. The Applicant will provide a copy to the Examiner upon request. (27 pages).
United States Patent and Trademark Office, "Non-Final Rejection" Issued in connection with U.S. Appl. No. 14/322,353 dated Sep. 11, 2018. This reference is not provided as it is a USPTO paper. The Applicant will provide a copy to the Examiner upon request. (26 pages).
United States Patent and Trademark Office, "Final Rejection" Issued in connection with U.S. Appl. No. 14/322,353 dated May 17, 2019. This reference is not provided as it is a USPTO paper. The Applicant will provide a copy to the Examiner upon request. (26 pages).
United States Patent and Trademark Office, "Non-Final Rejection" Issued in connection with U.S. Appl. No. 14/322,353 dated Dec. 27, 2019. This reference is not provided as it is a USPTO paper. The Applicant will provide a copy to the Examiner upon request. (24 pages).
United States Patent and Trademark Office, "Final Rejection" Issued in connection with U.S. Appl. No. 14/465,838 dated Jun. 22, 2018. This reference is not provided as it is a USPTO paper. The Applicant will provide a copy to the Examiner upon request. (18 pages).
United States Patent and Trademark Office, "Final Rejection" Issued in connection with U.S. Appl. No. 14/584,494 dated Aug. 10, 2018. This reference is not provided as it is a USPTO paper. The Applicant will provide a copy to the Examiner upon request. (20 pages).
United States Patent and Trademark Office, "Non-Final Rejection" Issued in connection with U.S. Appl. No. 14/584,588 dated Aug. 12, 2015. This reference is not provided as it is a USPTO paper. The Applicant will provide a copy to the Examiner upon request. (10 pages).
United States Patent and Trademark Office, "Final Rejection" Issued in connection with U.S. Appl. No. 14/584,588 dated Mar. 24, 2016. This reference is not provided as it is a USPTO paper. The Applicant will provide a copy to the Examiner upon request. (17 pages).
United States Patent and Trademark Office, "Non-Final Rejection" Issued in connection with U.S. Appl. No. 14/584,588 dated Apr. 21,

(56) References Cited

OTHER PUBLICATIONS

2017. This reference is not provided as it is a USPTO paper. The Applicant will provide a copy to the Examiner upon request. (14 pages).
United States Patent and Trademark Office, "Final Rejection" Issued in connection with U.S. Appl. No. 14/584,588 dated Dec. 13, 2017. This reference is not provided as it is a USPTO paper. The Applicant will provide a copy to the Examiner upon request. (18 pages).
United States Patent and Trademark Office, "Non-Final Rejection" Issued in connection with U.S. Appl. No. 14/584,588 dated Sep. 13, 2018. This reference is not provided as it is a USPTO paper. The Applicant will provide a copy to the Examiner upon request. (20 pages).
United States Patent and Trademark Office, "Final Rejection" Issued in connection with U.S.Appl. No. 14/584,588 dated Jan. 18, 2019. This reference is not provided as it is a USPTO paper. The Applicant will provide a copy to the Examiner upon request. (12 pages).
United States Patent and Trademark Office, "Final Rejection" Issued in connection with U.S. Appl. No. 14/585,728 dated Nov. 30, 2018. This reference is not provided as it is a USPTO paper. The Applicant will provide a copy to the Examiner upon request. (17 pages).
United States Patent and Trademark Office, "Non-Final Rejection" Issued in connection with U.S. Appl. No. 14/585,728 dated Jul. 17, 2019. This reference is not provided as it is a USPTO paper. The Applicant will provide a copy to the Examiner upon request. (18 pages).
United States Patent and Trademark Office, "Non-Final Rejection" Issued in connection with U.S. Appl. No. 14/823,670 dated Nov. 2, 2017. This reference is not provided as it is a USPTO paper. The Applicant will provide a copy to the Examiner upon request. (16 pages).
United States Patent and Trademark Office, "Final Rejection" Issued in connection with U.S. Appl. No. 14/823,670 dated Aug. 31, 2018. This reference is not provided as it is a USPTO paper. The Applicant will provide a copy to the Examiner upon request. (18 pages).
United States Patent and Trademark Office, "Non-Final Rejection" Issued in connection with U.S. Appl. No. 14/969,773 dated Jun. 6, 2018. This reference is not provided as it is a USPTO paper. The Applicant will provide a copy to the Examiner upon request. (14 pages).
United States Patent and Trademark Office, "Final Rejection" Issued in connection with U.S. Appl. No. 14/969,773 dated Nov. 29, 2018. This reference is not provided as it is a USPTO paper. The Applicant will provide a copy to the Examiner upon request. (17 pages).
United States Patent and Trademark Office, "Non-Final Rejection" Issued in connection with U.S. Appl. No. 14/969,773 dated Jul. 15, 2019. This reference is not provided as it is a USPTO paper. The Applicant will provide a copy to the Examiner upon request. (20 pages).
United States Patent and Trademark Office, "Non-Final Rejection" Issued in connection with U.S. Appl. No. 14/972,801 dated Jun. 29, 2018. This reference is not provided as it is a USPTO paper. The Applicant will provide a copy to the Examiner upon request. (23 pages).
United States Patent and Trademark Office, "Final Rejection" Issued in connection with U.S. Appl. No. 14/972,801 dated Nov. 29, 2018. This reference is not provided as it is a USPTO paper. The Applicant will provide a copy to the Examiner upon request. (24 pages).
United States Patent and Trademark Office, "Non-Final Rejection" Issued in connection with U.S. Appl. No. 14/972,801 dated Jul. 15, 2019. This reference is not provided as it is a USPTO paper. The Applicant will provide a copy to the Examiner upon request. (25 pages).
United States Patent and Trademark Office, "Non-Final Rejection" Issued in connection with U.S. Appl. No. 14/973,246 dated May 15, 2018. This reference is not provided as it is a USPTO paper. The Applicant will provide a copy to the Examiner upon request. (17 pages).
United States Patent and Trademark Office, "Final Rejection" Issued in connection with U.S. Appl. No. 14/973,246 dated Nov. 29, 2018. This reference is not provided as it is a USPTO paper. The Applicant will provide a copy to the Examiner upon request. (21 pages).
United States Patent and Trademark Office, "Non-Final Rejection" Issued in connection with U.S. Appl. No. 14/973,246 dated Jul. 29, 2019. This reference is not provided as it is a USPTO paper. The Applicant will provide a copy to the Examiner upon request. (11 pages).
United States Patent and Trademark Office, "Final Rejection" Issued in connection with U.S. Appl. No. 14/978,403 dated Nov. 1, 2018. This reference is not provided as it is a USPTO paper. The Applicant will provide a copy to the Examiner upon request. (20 pages).
United States Patent and Trademark Office, "Non-Final Rejection" Issued in connection with U.S. Appl. No. 14/978,403 dated Jul. 10, 2019. This reference is not provided as it is a USPTO paper. The Applicant will provide a copy to the Examiner upon request. (37 pages).
United States Patent and Trademark Office, "Non-Final Rejection" Issued in connection with U.S. Appl. No. 14/978,489 dated Sep. 11, 2018. This reference is not provided as it is a USPTO paper. The Applicant will provide a copy to the Examiner upon request. (13 pages).
United States Patent and Trademark Office, "Final Rejection" Issued in connection with U.S. Appl. No. 14/978,489 dated Jan. 17, 2019. This reference is not provided as it is a USPTO paper. The Applicant will provide a copy to the Examiner upon request. (19 pages).
United States Patent and Trademark Office, "Non-Final Rejection" Issued in connection with U.S. Patent Appl. No. 14/978,609 dated Dec. 27, 2017. This reference is not provided as it is a USPTO paper. The Applicant will provide a copy to the Examiner upon request. (14 pages).
United States Patent and Trademark Office, "Final Rejection" Issued in connection with U.S. Appl. No. 14/978,609 dated Jul. 24, 2018. This reference is not provided as it is a USPOT paper. The Applicant will provide a copy to the Examiner upon request. (17 pages).
United States Patent and Trademark Office, "Non-Final Rejection" Issued in connection with U.S.Appl. No. 15/132,683 dated Mar. 8, 2019. This reference is not provided as it is a USPTO paper. The Applicant will provide a copy to the Examiner upon request. (24 pages).
United States Patent and Trademark Office, "Final Rejection" Issued in connection with U.S. Appl. No. 15/132,683 dated Nov. 25, 2019. This reference is not provided as it is a USPTO paper. The Applicant will provide a copy to the Examiner upon request. (25 pages).
United States Patent and Trademark Office, "Non-Final Rejection" Issued in connection with U.S. Appl. No. 15/137,628 dated Oct. 22, 2018. This reference is not provided as it is a USPTO paper. The Applicant will provide a copy to the Examiner upon request. (12 pages).
United States Patent and Trademark Office, "Final Rejection" Issued in connection with U.S. Appl. No. 15/137,628 dated Jun. 3, 2019. This reference is not provided as it is a USPTO paper. The Applicant will provide a copy to the Examiner upon request. (13 pages).
United States Patent and Trademark Office, "Non-Final Rejection" Issued in connection with U.S. Appl. No. 15/490,751 dated May 3, 2019. This reference is not provided as it is a USPTO paper. The Applicant will provide a copy to the Examiner upon request. (14 pages).
United States Patent and Trademark Office, "Non-Final Rejection" Issued in connection with U.S. Patent Appl. No. 15/491,903 dated Mar. 8, 2019. This reference is not provided as it is a USPTO paper. The Applicant will provide a copy to the Examiner upon request. (16 pages).
United States Patent and Trademark Office, "Final Rejection" Issued in connection with U.S. Appl. No. 15/491,903 dated Sep. 18, 2019. This reference is not provided as it is a USPTO paper. The Applicant will provide a copy to the Examiner upon request. (19 pages).
United States Patent and Trademark Office, "Non-Final Rejection" Issued in connection with U.S. Appl. No. 15/603,352 dated Aug. 10, 2017. This reference is not provided as it is a USPTO paper. The Applicant will provide a copy to the Examiner upon request. (21 pages).
United States Patent and Trademark Office, "Final Rejection" Issued in connection with U.S. Appl. No. 15/603,352 dated Feb. 12, 2018.

(56) References Cited

OTHER PUBLICATIONS

This reference is not provided as it is a USPTO paper. The Applicant will provide a copy to the Examiner upon request. (25 pages).
United States Patent and Trademark Office, "Non-Final Rejection" Issued in connection with U.S. Appl. No. 15/630,806 dated Dec 6, 2017. This reference is not provided as it is a USPTO paper. The Applicant will provide a copy to the Examiner upon request. (12 pages).

* cited by examiner

| Attributes 232 | Touchpoint T4 204₁ | Touchpoint T6 206₁ | Touchpoint T7 207₁ | Touchpoint T8 208₁ | Touchpoint T5 205₁ | Touchpoint T9 209₁ |
|---|---|---|---|---|---|---|
| INDICATOR | 1 | 1 | 1 | 1 | 1 | 0 |
| USER | UUID123 | UUID456 | UUID123 | UUID456 | UUID789 | UUID789 |
| EVENT | Impression | Click | Click | Impression | Impression | Click |
| FREQUENCY | 1 | 2 | 3 | 4 | 5 | 6 |
| RECENCY | 30+ Days | 1-2 Weeks | 1-2 Weeks | 1-2 Weeks | 1-2 Weeks | <2 hours |
| CHANNEL | Display | Search | Search | Display | Display | Search |
| COUPON ID | None | None | 10% off | 20% off | 20% off | None |
| TACTIC | Behavioral Electronics | Non-Branded PPC | Non-Branded PPC | Copyrighting | Retargeting Conquest | Branded PPC |
| MESSAGE | Brand | Call to Action | Call to Action | Call to Action | Call to Action | Brand |
| CAMPAIGN | Q3 Reach Campaign | Q3 PPC Non-Branded | Q3 PPC Non-Branded | Q3 Retargeting | Q3 Yahoo Retargeting | Q3 PPC Brand |
| PLACEMENT / KEYWORD | Yahoo-Reach-15.1 300x250 | Digital SLR | Best Rated Digital Camera | DataXu-RT-1.3.1 300x250 | Yahoo-RT-1.1.1 300x250 | Amazon Olympus Camera 5 |
| PUBLISHER | Yahoo! | Google | Google | DataXu | Yahoo! | Google |
| CREATIVE | BrandCreative_300 x250.swf | Call to Action Copy | Call to Action Copy | Dynamic Creative_300x250 | Dynamic Creative_300x250 | Brand Copy |
| SIZE | 300x250 | 0x0 | 0x0 | 300x250 | 300x250 | 0x0 |

2B00

Response Data Store 236

FIG. 3B

Category Lift http://www.example.com/category_lift

Configuration Set: Quote Completes
Conversion Type: TRC Quote Complete Optimization
Period: Jun 01 2015 – Jun 30 2015

| Category | Converters | Reach | %ConverterRate | Lift |
|---|---|---|---|---|
| Desktop | 108,867 | 517,036,884 | 0.02106% | 0.88 |
| Mobile | 1,916 | 9,265,015 | 0.02068% | 0.98 |
| Unclassified PS | 5,025 | 65,606 | 7.65936% | 380.45 |
| Unclassified Display | 1,041 | 2,787,001 | 0.03735% | 1.78 |

FIG. 6C

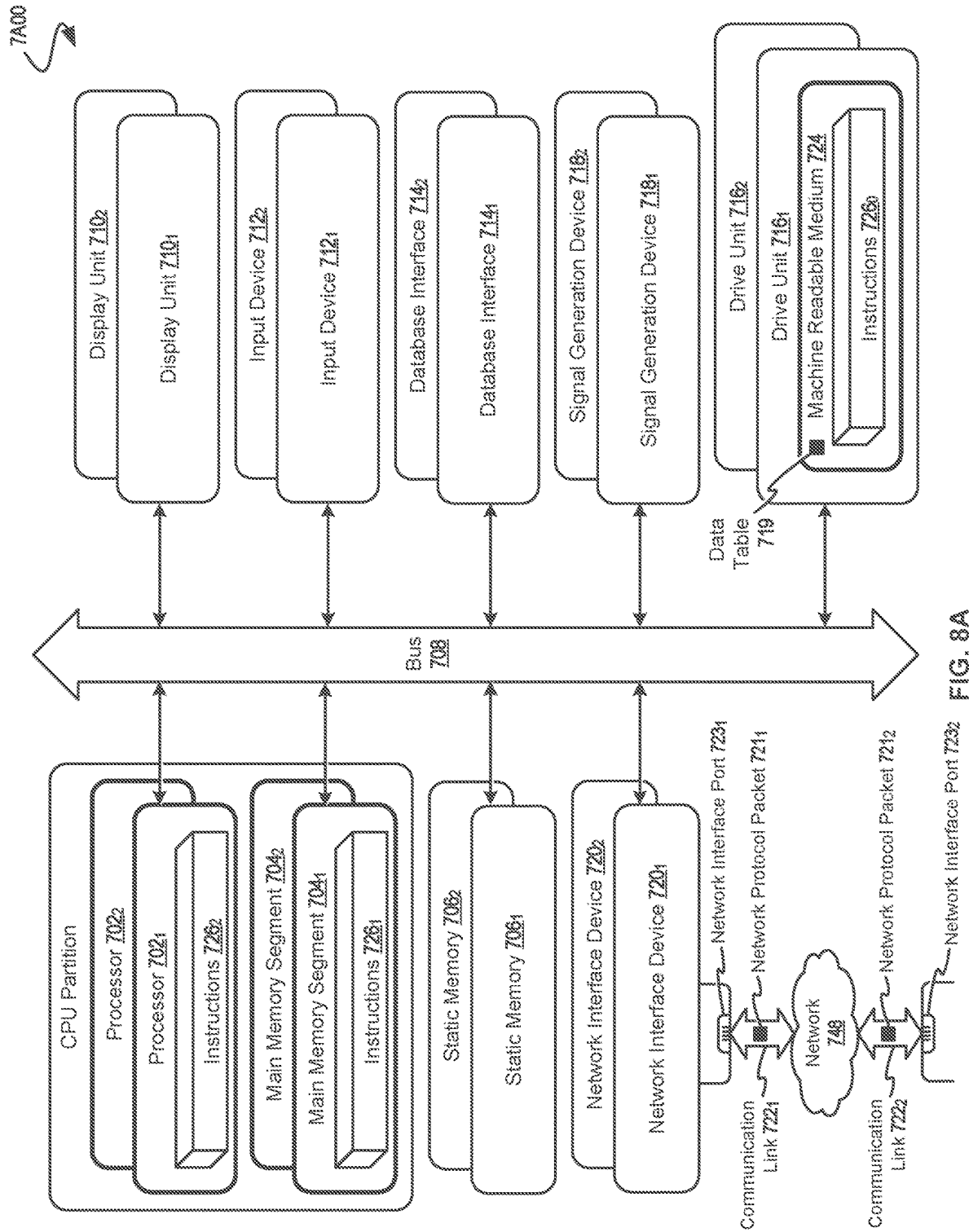

CROSS-DEVICE MESSAGE TOUCHPOINT ATTRIBUTION

RELATED APPLICATIONS

The present application claims the benefit of priority to U.S. Patent Application Ser. No. 62/324,787, entitled "CROSS-DEVICE MARKETING TOUCHPOINT ATTRIBUTION", filed Apr. 19, 2016 which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosure relates to the field of machine learning for predictive modeling of cause and effect and more particularly to techniques for cross-device marketing touchpoint attribution.

BACKGROUND

The prevalence of Internet or online advertising and marketing continues to grow at a fast pace. Today, an online user (e.g., prospect) in a given target audience can experience a high number of exposures (e.g., touchpoints) to a brand and products across multiple digital media channels (e.g., display, paid search, paid social, etc.) and across multiple devices (e.g., desktop computer, tablet, mobile phone, etc.) on the "journey" to conversion (e.g., buying a product, etc.) and/or to some other engagement state (e.g., brand introduction, brand awareness, etc.). Another online user in the same target audience might experience a different combination or permutation of touchpoints, yet might not convert. Large volumes of data characterizing the user interactivity with such high number of touchpoints is continuously collected in various forms such as in touchpoint attribute records, Internet cookies, log files, Internet pixel tags, mobile tracking, etc. The marketing manager of today desires to use this continuous stream of touchpoint data to learn exactly what touchpoints contributed the most to conversions (e.g., touchpoint attribution) in order to develop media spend scenarios and plans that allocate the marketing budget to those tactics that are deemed to be the most effective.

Certain "bottom-up" touchpoint response predictive modeling techniques can collect user level stimulus and response data (e.g., touchpoint attribute data, conversion data, etc.) to assign conversion credit to every touchpoint and touchpoint attribute (e.g., ad size, placement, publisher, creative, offer, etc.) experienced by every converting user and non-converting user across all channels. For example, such techniques can predict the contribution value of a given touchpoint for a given segment of users and/or for a given media channel. The marketing manager can use such predicted touchpoint contribution values to develop an intra-channel media spend plan. In some cases, certain sets of touchpoints can be presented to a single user on multiple devices. For example, a user might be exposed to touchpoint A on a desktop computer and then exposed to touchpoint B on a mobile phone. Unfortunately, legacy touchpoint response predictive models are limited at least in their ability to model such fragmented multiple- or cross-device effects in the touchpoint attribution.

Techniques are needed to address the problem of associating the fragmented cross-device touchpoints of each user when generating touchpoint attribution. None of the aforementioned legacy approaches achieve the capabilities of the herein-disclosed techniques for cross-device marketing touchpoint attribution. Therefore, there is a need for improvements.

BRIEF DESCRIPTION OF THE DRAWINGS

FIG. 3B presents a touchpoint attribute chart showing sample attributes associated with touchpoints of a media campaign, according to some embodiments.

FIG. 6C presents a category lift metrics interface used in systems for cross-device marketing touchpoint attribution, according to some embodiments.

FIG. 8A, and FIG. 8B depict block diagrams of computer system components suitable for implementing embodiments of the present disclosure.

DETAILED DESCRIPTION

Overview

Figure 1A:
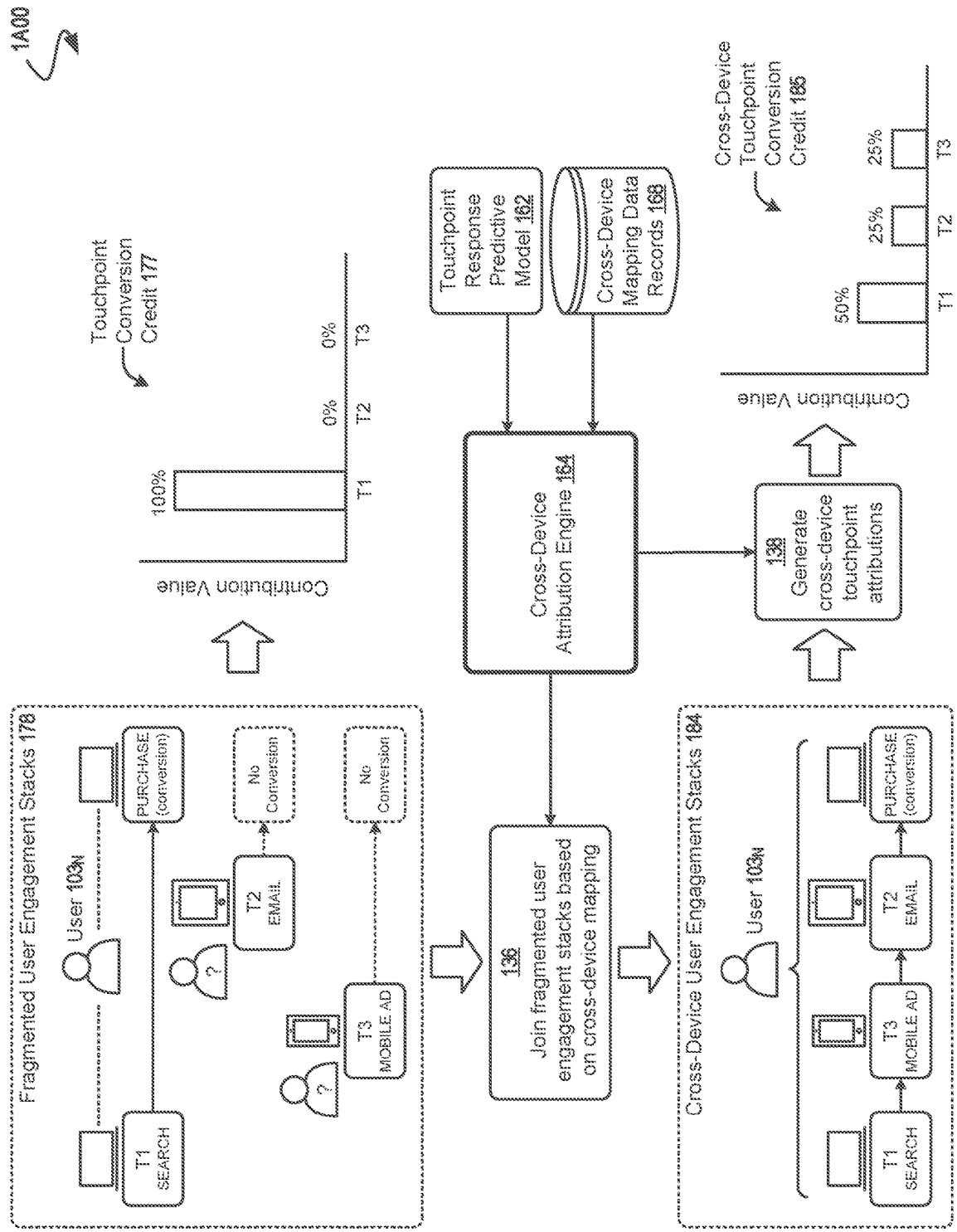
FIG. 1A illustrates a scenario for cross-device marketing touchpoint attribution, according to some embodiments.

Certain "bottom-up" touchpoint response predictive modeling techniques can collect user level stimulus and response data (e.g., touchpoint attribute data, conversion data, etc.) to assign conversion credit to every touchpoint (e.g., presented marketing message, presented banner advertisement, survey presentation, image impression, etc.) and touchpoint attribute (e.g., ad size, placement, publisher, creative, offer, etc.) experienced by every converting user (as well as by every non-converting user) across all channels. For example, such techniques can predict the contribution value of a given touchpoint for a given segment of users and/or media channel. The marketing manager can use such predicted touchpoint contribution values to develop an intra-channel (e.g., touchpoint) media spend plan. In some cases, certain touchpoints can be exposed to a single user on multiple devices. For example, a user might be exposed to touchpoint A on a desktop computer and then exposed to touchpoint B on a mobile phone.

Disclosed herein is a cross-device attribution engine that uses cross-device mapping data to join fragmented user engagement stacks to produce a set of cross-device user engagement stacks that can be applied to a touchpoint response predictive model to generate cross-device touchpoint attributions. The cross-device associations linking certain identifiers provided in a set of cross-device mapping data records can be used join certain user touchpoint log data records comprising the linked identifiers to form the cross-device user engagement stacks. The cross-device touchpoint attribution parameters and/or related metrics generated from applying the cross-device user engagement stacks to the touchpoint response predictive model can be presented to the marketing manager by a marketing management application.

Definitions

Some of the terms used in this description are defined below for easy reference. The presented terms and their respective definitions are not rigidly restricted to these definitions—a term may be further defined by the term's use within this disclosure.

- The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.
- As used in this application and the appended claims, the term "or" is intended to mean an inclusive "or" rather than an exclusive "or" That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.
- The articles "a" and "an" as used in this application and the appended claims should generally be construed to mean "one or more" unless specified otherwise or is clear from the context to be directed to a singular form.

Solutions Rooted in Technology

The appended figures corresponding discussion given herein provides sufficient disclosure to make and use systems, methods, and computer program products that address the aforementioned issues with legacy approaches. More specifically, the present disclosure provides a detailed description of techniques used in systems, methods, and in computer program products for cross-device marketing touchpoint attribution. Certain embodiments are directed to technological solutions for associating (e.g., joining) fragmented user engagement stacks using cross-device mapping data to apply to a touchpoint response predictive model to generate cross-device touchpoint attributions, which embodiments advance the relevant technical fields, as well as advancing peripheral technical fields related to machine learning. In particular, the herein-disclosed techniques provide technical solutions that address the technical problems attendant to associating the fragmented cross-device touchpoints of each user when generating touchpoint attribution.

Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to modeling and correlation in machine learning systems.

Reference is now made in detail to certain embodiments. The disclosed embodiments are not intended to be limiting of the claims.

DESCRIPTIONS OF EXEMPLARY EMBODIMENTS

FIG. 1A illustrates a scenario 1A00 for cross-device marketing touchpoint attribution. As an option, one or more instances of scenario 1A00 or any aspect thereof may be implemented in the context of the architecture and functionality of the embodiments described herein. Also, the scenario 1A00 or any aspect thereof may be implemented in any desired environment.

As shown in the scenario 1A00, various touchpoints (e.g., including marketing messages, banner advertisements, emails, surveys, etc.) exposed on multiple devices can comprise a set of fragmented user engagement stacks 178. Such touchpoints can be "fragmented" when associations (e.g., mapping) between users and the one or more devices used by a respective user are not established across all such devices. Specifically, a user $103_N$ might be determined to be associated with a certain laptop computer device using browser cookie data captured when the user $103_N$ is logged into various online accounts. For example, when the user $103_N$ searches for clothing on the laptop and clicks on the paid search ad for Brand X (e.g., touchpoint T1), the touchpoint response data can associate touchpoint T1 to user $103_N$ using a universally unique identifier (UUID), such as a user ID. The touchpoint response data can further indicate that the user $103_N$ made a Brand X purchase (e.g., conversion) on the laptop at a later time. In some cases, the user $103_N$ might further use other devices (e.g., mobile phone, tablet, etc.) yet not be associated with such devices by the foregoing UUID. Specifically, activity on mobile devices can be associated with a device identifier (DID) and/or mobile identification number (MIN). For example, prior to conversion on the laptop, the user $103_N$ might have seen and been influenced by an ad from Brand X on a mobile phone (e.g., touchpoint T3), and by a promotional email from Brand X on a tablet (e.g., touchpoint T2), yet such touchpoints might appear fragmented from touchpoint T1 and each other in the touchpoint response data. Such fragmentation can result in a touchpoint conversion credit 177 that attributes all the credit for the conversion to touchpoint T1, and no credit for the conversion to touchpoint T2 or touchpoint T3.

The herein disclosed techniques can address such problems with associating the fragmented cross-device touchpoints of each user when generating touchpoint attribution. Specifically, a cross-device attribution engine 164 can use certain instances of cross-device mapping data records 168 to join the fragmented user engagement stacks 178 to produce a set of cross-device user engagement stacks 184 (see operation 136). The cross-device attribution engine 164 can further apply the cross-device user engagement stacks 184 to a touchpoint response predictive model 162 to generate cross-device touchpoint attributions (see operation 138). Specifically, for example, the cross-device user engagement stacks 184 can comprise an engagement stack for user $103_N$ that links the touchpoints (e.g., T1, T3, and T2) experienced across all the devices (e.g., laptop, mobile phone, and tablet, respectively) used by the user $103_N$. When the cross-device user engagement stacks 184 are applied to the touchpoint response predictive model 162, a chart of the cross-device touchpoint conversion credit 185 is produced. As shown, touchpoint T1 might now receive 50% of the conversion credit, and touchpoint T2 and touchpoint T3 might now each receive 25% of the conversion credit.

The cross-device touchpoint conversion credit 185 provided by the herein disclosed techniques can show a more complete and/or accurate view of media impact across multiple devices. Specifically, the marketing manager might use the results produced by the herein disclosed techniques to better understand the true (e.g., more accurate) effectiveness and/or return on investment (ROI) of campaigns associated with certain device types and/or channels to enable more effective cross-device and/or cross-channel media spend allocations. Such techniques disclosed herein for cross-device marketing touchpoint attribution are described in more detail in the following.

Figure 1B:
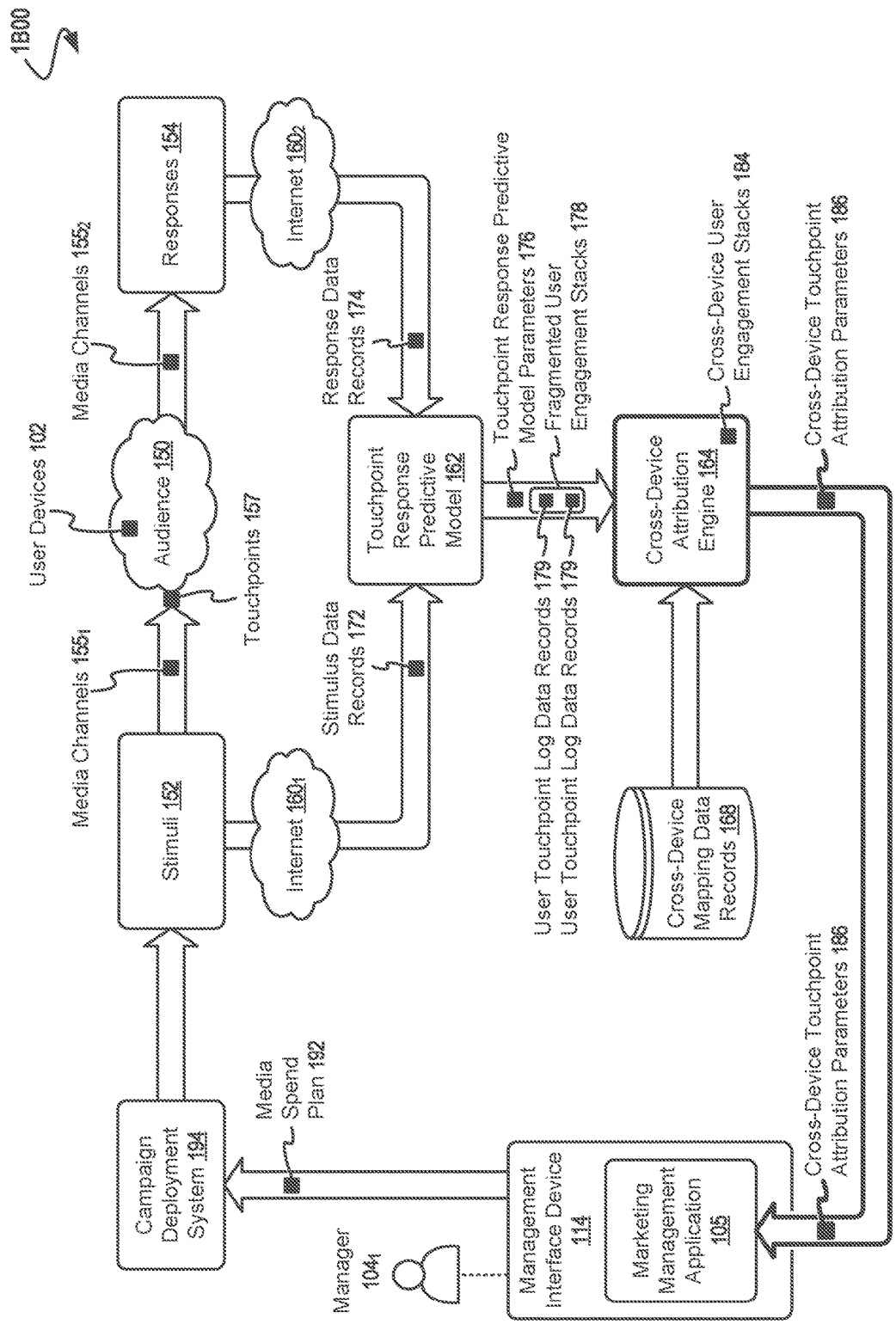
FIG. 1B depicts techniques for cross-device marketing touchpoint attribution, according to an embodiment.

FIG. 1B depicts techniques 1B00 for cross-device marketing touchpoint attribution. As an option, one or more instances of techniques 1B00 or any aspect thereof may be implemented in the context of the architecture and functionality of the embodiments described herein. Also, the techniques 1B00 or any aspect thereof may be implemented in any desired environment.

As shown in FIG. 1B, a set of stimuli 152 is presented to an audience 150 (e.g., as part of a marketing campaign), that further produces a set of responses 154. For example, the stimuli 152 might be part of a marketing campaign developed by a marketing manager (e.g., manager $104_1$) to reach the audience 150 with the objective to generate user conversions (e.g., sales of a certain product). The stimuli 152 is delivered to the audience 150 through certain instances of media channels $155_1$ that can comprise digital or online media channels (e.g., online display, online search, paid social media, email, etc.). The media channels $155_1$ can further comprise non-digital or offline media channels (e.g., TV, radio, print, etc.). The audience 150 is exposed to each stimulation comprising the stimuli 152 through a set of touchpoints 157 characterized by certain respective attributes. The responses 154 can also be delivered through other instances of media channels $155_2$ that can further comprise online and offline media channels. In some cases, the information indicating a particular response can be included in the attribute data associated with the instance of the touchpoints 157 to which the user is responding. The portion of stimuli 152 delivered through online media channels can be received by the users comprising audience 150 at various instances of user devices 102 (e.g., mobile phone, laptop computer, desktop computer, tablet, etc.). Further, the portion of responses 154 received through digital media channels can also be invoked by the users comprising audience 150 using the user devices 102.

As further shown, a set of stimulus data records 172 and a set of response data records 174 can be received over a network (e.g., Internet $160_1$ and Internet $160_2$, respectively) to be used to generate a touchpoint response predictive model 162. The touchpoint response predictive model 162 can be used to estimate the effectiveness of each stimulus in a certain marketing campaign by attributing conversion credit (e.g., contribution value) to the various stimuli comprising the campaign. More specifically, touchpoint response predictive model 162 can be used to estimate the attribution (e.g., contribution value) of each stimulus and/or group of stimuli (e.g., a channel from the media channels $155_1$) to the conversions comprising the response data records 174. The touchpoint response predictive model 162 can be formed using any machine learning techniques (e.g., see FIG. 2A) to accurately model the relationship between the stimuli 152 and the responses 154. For example, weekly summaries of the stimulus data records 172 and the response data records 174 over a certain historical period (e.g., last six months) can be used to generate the touchpoint response predictive model 162. When formed, the touchpoint response predictive model 162 can be described in part by certain model parameters (e.g., input variables, output variables, equations, equation coefficients, mapping relationships, limits, constraints, etc.) comprising the touchpoint response predictive model parameters 176.

According to the herein disclosed techniques, the cross-device attribution engine 164 can be used to address the problems attendant to associating touchpoints that are fragmented across multiple instances of the user devices 102 used by a respective user in the audience 150 when generating touchpoint attribution. Such user touchpoints and/or collections of associated touchpoints fragmented across user devices can comprise instances of the fragmented user engagement stacks 178. For example, the fragmented user engagement stacks 178 might comprise certain associated sets of user touchpoint log data records 179 derived from the stimulus data records 172 and/or the response data records 174. The cross-device attribution engine 164 can join the fragmented user engagement stacks 178 using cross-device mapping data records 168 to produce instances of the cross-device user engagement stacks 184. The cross-device attribution engine 164 can further apply the cross-device user engagement stacks 184 to the touchpoint response predictive model parameters 176 characterizing the touchpoint response predictive model 162 to generate cross-device touchpoint attributions. Certain instances of cross-device touchpoint attribution parameters 186 characterizing the cross-device touchpoint attributions can be presented to a marketing manager (e.g., manager $104_1$) for analysis and/or selection of a media spend allocation plan for a given marketing campaign. For example, the manager $104_1$ can access certain representations (e.g., performance metrics, charts, graphs, tables, etc.) of the cross-device touchpoint attribution parameters 186 using a marketing management application 105 operating on a management interface device 114 (e.g., laptop computer). The manager $104_1$ can analyze the performance metrics associated with the cross-device touchpoint attribution parameters 186 to select a media spend plan 192 for deployment to the audience 150 by a campaign deployment system 194.

The herein-disclosed technological solution described by the techniques 1B00 in FIG. 1B can be implemented in various network computing environments and associated online and offline marketplaces. Such an environment is discussed as pertains to FIG. 1C.

Figure 1C:
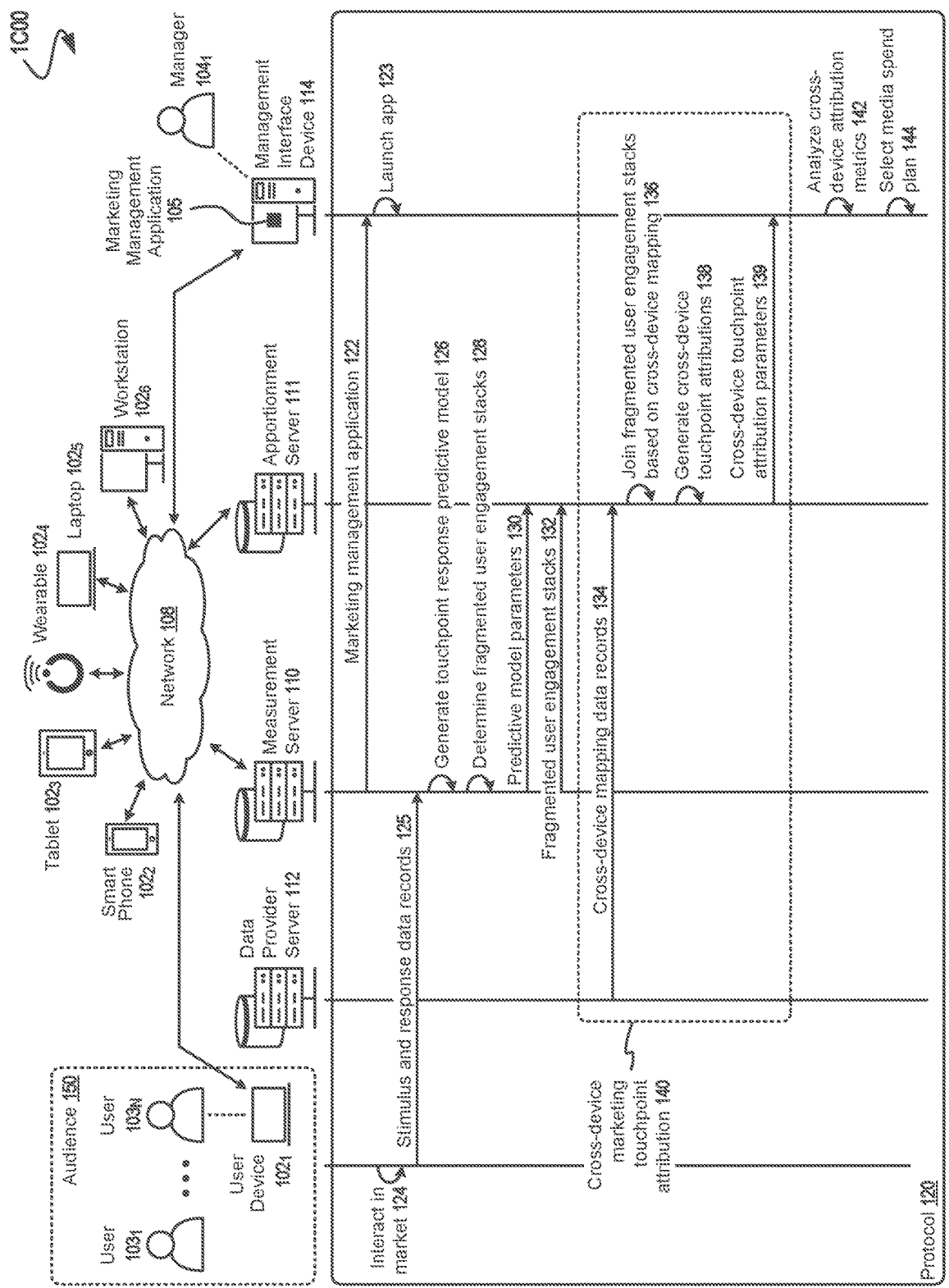
FIG. 1C shows an environment in which embodiments of the present disclosure can operate.

FIG. 1C shows an environment 1C00 in which embodiments of the present disclosure can operate. As shown in FIG. 1C, the environment 1C00 comprises various computing systems (e.g., servers and devices) interconnected by a network 108. The network 108 can comprise any combination of a wide area network (e.g., WAN), local area network (e.g., LAN), cellular network, wireless LAN (e.g., WLAN), or any such means for enabling communication of computing systems. The network 108 can also be referred to as the Internet. More specifically, environment 1C00 comprises at least one instance of a measurement server 110, at least one instance of an apportionment server 111, at least one instance of data provider server 112, and at least one instance of the management interface device 114. The servers and devices shown in environment 1C00 can represent any single computing system with dedicated hardware and software, multiple computing systems clustered together (e.g., a server farm, a host farm, etc.), a portion of shared resources on one or more computing systems (e.g., a virtual server), or any combination thereof. In one or more embodiments, the data provider server 112 can represent an entity (e.g., cross-device data provider) in an online advertising ecosystem that might aggregate certain online activity data (e.g., login information, connection IP addresses, Wi-Fi networks used, websites visited, etc.) for the purposes of determining the devices operated by the same user. Such cross-device mapping can produce cross-device mapping data (e.g., cross-device mapping data records 168) using various methods, such as deterministic matching, probabilistic matching, and/or other methods. In some cases the cross-device mapping is based on a shared characteristic between two more user devices (e.g., login information in common, one or more shared IP addresses, one or more shared Wi-Fi networks used, similar websites visited, etc.).

The environment 1C00 further comprises at least one instance of a user device $102_1$ that can represent one of a variety of other computing devices (e.g., user devices 102, a smart phone $102_2$, a tablet $102_3$, a wearable $102_4$, a laptop $102_5$, a workstation $102_6$, etc.) having software (e.g., a browser, mobile application, etc.) and hardware (e.g., a graphics processing unit, display, monitor, etc.) capable of processing and displaying information (e.g., web page, graphical user interface, etc.) on a display. The user device $102_1$ can further communicate information (e.g., web page request, user activity, electronic files, computer files, etc.) over the network 108. The user device $102_1$ can be operated by a user $103_N$. Other users (e.g., user $103_1$) with or without a corresponding user device can comprise the audience 150. Also, as earlier described in FIG. 1B, the marketing management application 105 can be operating on the management interface device 114 and accessible by the manager $104_1$.

As shown, the user $103_1$, the user device $102_1$ (e.g., operated by user $103_N$), the measurement server 110, the apportionment server 111, the data provider server 112, and the management interface device 114 (e.g., operated by the manager $104_1$) can exhibit a set of high-level interactions (e.g., operations, messages, etc.) in a protocol 120. Specifically, the protocol can represent interactions in systems for cross-device marketing touchpoint attribution. As shown, the manager $104_1$ can download the marketing management application 105 from the measurement server 110 to the management interface device 114 (see message 122) and launch the application (see operation 123). Users in audience 150 can also interact with various marketing campaign stimuli delivered through certain media channels (see operation 124), such as taking one or more measureable actions in response to such stimuli and/or other non-media effects. Information characterizing the stimuli and responses of the audience 150 can be collected as stimulus data records (e.g., stimulus data records 172) and response data records (e.g., response data records 174) by the measurement server 110 (see message 125). Using the stimulus and response data, the measurement server 110 can generate a stimulus attribution predictive model (see operation 126), such as touchpoint response predictive model 162. The measurement server 110 can further use the stimulus and response data to determine a set of fragmented user engagement stacks (see operation 128). For example, the fragmented user engagement stacks can be generated by linking touchpoints known to be associated with a given user based on the information (e.g., fragmented cross-device touchpoints) provided in the stimulus and response data. The model parameters characterizing the aforementioned generated predictive model can be availed to the apportionment server 111 (see message 130). The information representing the fragmented user engagement stacks can further be provided to the apportionment server 111 (see message 132).

As highlighted in the protocol 120, a grouping 140 can represent one embodiment of certain messages and operations used in systems and protocols for cross-device marketing touchpoint attribution. Specifically, such a grouping of interactions might commence with certain cross-device mapping data records received by the apportionment server 111 from the data provider server 112 (see message 134). The apportionment server 111 can use the cross-device mapping data to join the fragmented user engagement stacks (see operation 136). The joined cross-device engagement stacks can be applied to the touchpoint response predictive model to generate cross-device touchpoint attributions (see operation 138). The cross-device touchpoint attribution parameters characterizing the cross-device touchpoint attributions can then be availed to the management interface device 114 (see message 139). As earlier mentioned, the manager $104_1$ can analyze the cross-device touchpoint attribution performance metrics (see operation 142) to select a media spend plan for deployment to the audience 150 (see operation 144).

As shown in FIG. 1C, the techniques disclosed herein address the problems attendant to associating the fragmented cross-device touchpoints of each user when generating touchpoint attribution, in part, by applying a set of cross-device touchpoint engagement stacks to a touchpoint response predictive model (e.g., touchpoint response predictive model 162). More details pertaining such touchpoint response predictive models are discussed in the following and herein.

Internet of Things System Embodiments

Figure 2:
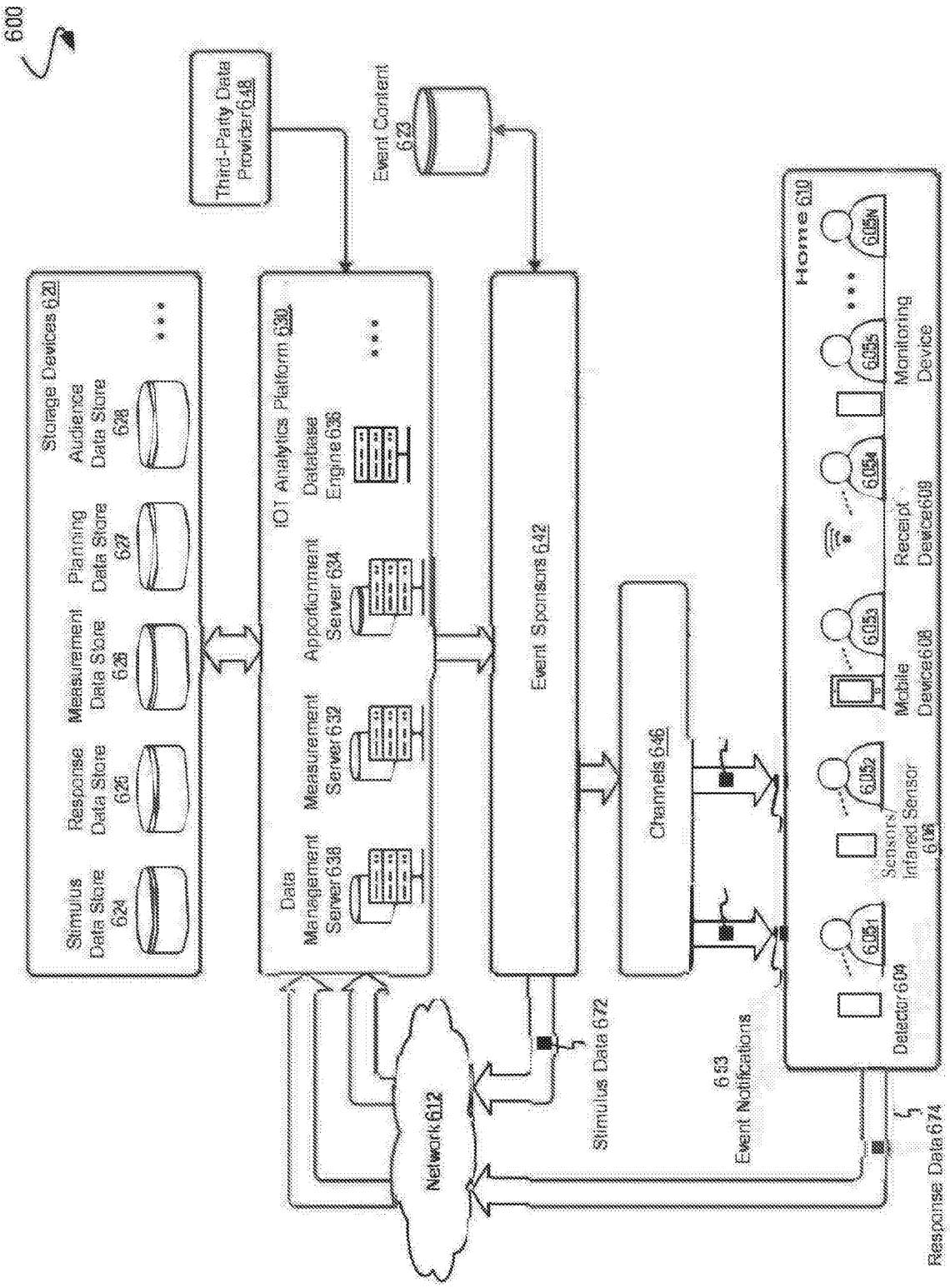
FIG. 2 depicts an environment 600 in which embodiments of the present disclosure can operate.

FIG. 2 depicts an environment 600 in which embodiments of the present disclosure can operate. As an option, one or more instances of environment 600 or any aspect thereof may be implemented in the context of the architecture and functionality of the embodiments described herein. Also, the environment 600 or any aspect thereof may be implemented in any desired environment.

The present invention has application for systems that utilize the Internet of Things (IOT). For these embodiments, systems communicate to environments, such as a home environment, to employ event campaigns that use stimuli to effectuate desired user responses. Specifically, devices may be placed in the home to both communicate event messages or notifications as well as receive responses, either responses gathered by sensing users or by direct input to electronic devices by the users. Embodiments for implementing the present invention in such an environment are shown in FIG. 2.

The shown environment 600 depicts a set of users (e.g., user $605_1$, user $605_2$, user $605_3$, user $605_4$, user $605_5$, to user $605_N$) comprising an audience 610 that might be targeted by one or more event sponsors 642 in various event campaigns. The users may view a plurality of event notifications 653 on a reception device 609 (e.g., desktop PC, laptop PC, mobile device, wearable, television, radio, etc.). The event notifications 653 can be provided by the event sponsors 642 through any of a plurality of channels 746 in the wired environment (e.g., desktop PC, laptop PC, mobile device, wearable, television, radio, print, etc.). Stimuli from the channels 646 comprise instances of touchpoints 660 experienced by the users. As an example, a TV spot may be viewed on a certain TV station (e.g., touchpoint T1), and/or a print message (e.g., touchpoint T2) in a magazine. Further, the stimuli channels 746 might present to the users a banner ad on a mobile browser (e.g., touchpoint T3), a sponsored website (e.g., touchpoint T4), and/or an event notification in an email message (e.g., touchpoint T5). The touchpoints 660 can be described by various touchpoint attributes, such as data, time, campaign, event, geography, demographics, impressions, cost, and/or other attributes.

According to one implementation, an IOT analytics platform 630 can receive instances of stimulus data 672 (e.g., stimulus touchpoint attributes, etc.) and instances of response data 674 (e.g., response measurement attributes, etc.) via network 612, describing, in part, the measured responses of the users to the delivered stimulus (e.g., touchpoints 660). The measure responses are derived from certain user interactions as sensed in the home (e.g., detector 604, sensor/infrared sensor 606, or monitoring device 611) or transmitted by the user (e.g., mobile device 611, etc.) performed by certain users and can be described by various response attributes, such as data, time, response channel, event, geography, revenue, lifetime value, and other attributes. A third-party data provider 648 can further provide data (e.g., user behaviors, user demographics, cross-device mapping, etc.) to the IOT analytics platform 630. The collected data and any associated generated data can be stored in one or more storage devices 620 (e.g., stimulus data store 624, response data store 625, measurement data store 626, planning data store 627, audience data store 628, etc.), which are made accessible by a database engine 636 (e.g., query engine, result processing engine, etc.) to a measurement server 632 and an apportionment server 634. Operations performed by the measurement server 632 and the apportionment server 634 can vary widely by embodiment. As an example, the measurement server 632 can be used to analyze certain data records stored in the stimulus data store 624 and response data store 625 to determine various performance metrics associated with an event campaign, storing such performance metrics and related data in measurement data store 626. Further, for example, the apportionment server 634 may be used to generate event campaign plans and associated event spend apportionment, storing such information in the planning data store 627.

Figure 3A:
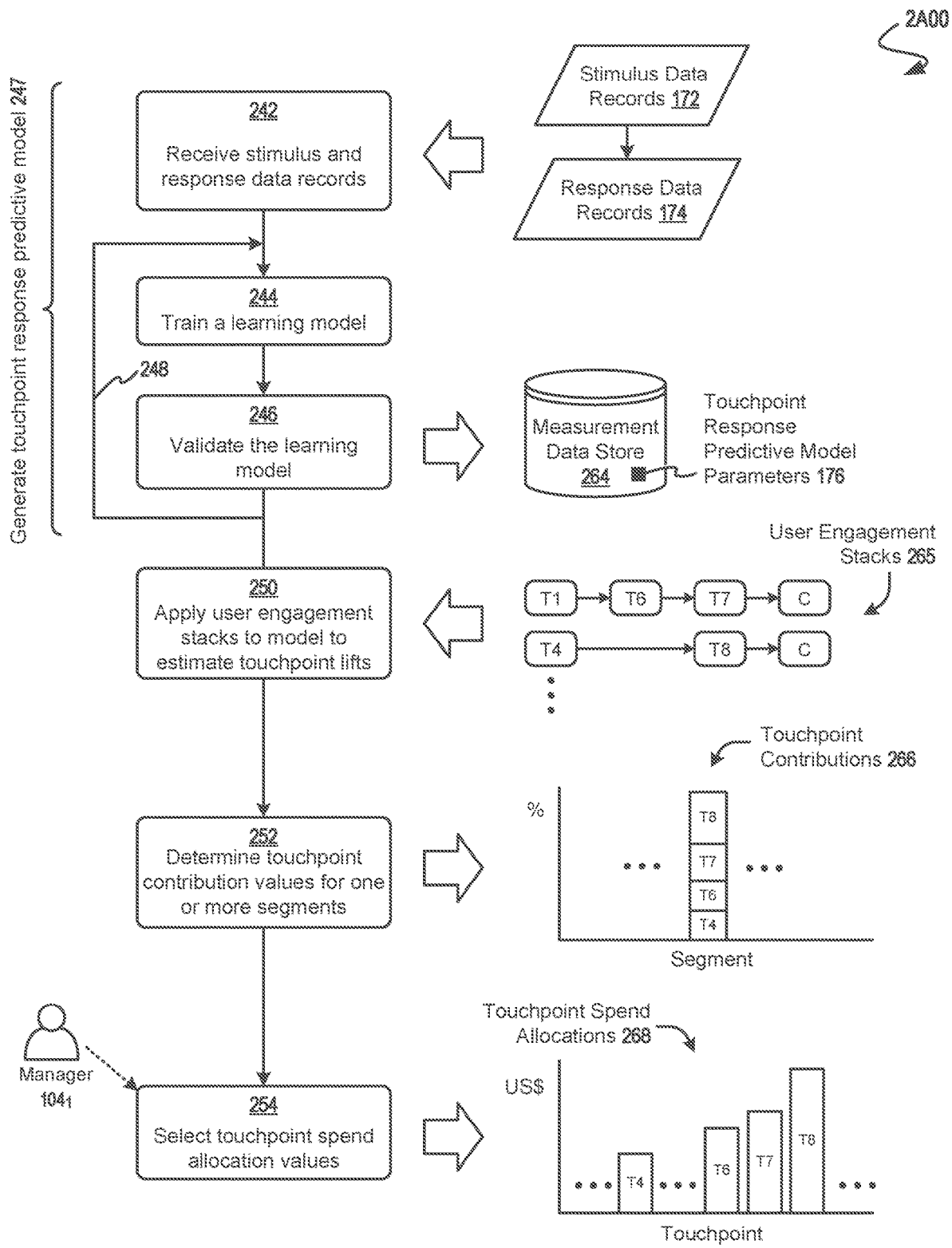
FIG. 3A presents a touchpoint response predictive modeling technique used in systems for cross-device marketing touchpoint attribution, according to some embodiments.

FIG. 3A presents a touchpoint response predictive modeling technique 2A00 used in systems for cross-device marketing touchpoint attribution. As an option, one or more instances of touchpoint response predictive modeling technique 2A00 or any aspect thereof may be implemented in the context of the architecture and functionality of the embodiments described herein. Also, the touchpoint response predictive modeling technique 2A00 or any aspect thereof may be implemented in any desired environment.

FIG. 3A depicts process steps (e.g., touchpoint response predictive modeling technique 2A00) used in the generation of a touchpoint response predictive model (see grouping 247). As shown, stimulus data records 172 and response data records 174 associated with one or more historical marketing campaigns and/or time periods are received by a computing device and/or system (e.g., measurement server 110) over a network (see step 242). The information associated with the stimulus data records 172 and response data records 174 can be organized in various data structures. A portion of the collected stimulus and response data can be used to train a learning model (see step 244). A different portion of the collected stimulus and response data can be used to validate the learning model (see step 246). The processes of training and/or validating can be iterated (see path 248) until the learning model behaves within target tolerances (e.g., with respect to predictive statistic metrics, descriptive statistics, significance tests, etc.). In some cases, additional historical stimulus and response data can be collected to further train and/or validate the learning model. When the learning model has been generated, a set of touchpoint response predictive model parameters 176 (e.g., input variables, output variables, equations, equation coefficients, mapping relationships, limits, constraints, etc.) describing the learning model (e.g., touchpoint response predictive model 162) can be stored in a measurement data store 264 for access by various computing devices (e.g., measurement server 110, management interface device 114, apportionment server 111, etc.).

Specifically, certain user engagement stacks (e.g., user engagement stacks 265) might be applied to the learning model (e.g., touchpoint response predictive model 162) to estimate the touchpoint lifts (see step 250) contributing to conversions, brand engagement events, and/or other events. The contribution value of a given touchpoint can then be determined (see step 252) for a given segment of users and/or media channel. For example, executing step 250 and step 252 might generate a chart showing the touchpoint contributions 266 for a given segment. Specifically, a percentage contribution for a touchpoint T4, a touchpoint T6, a touchpoint T7, and a touchpoint T8 can be determined for the segment (e.g., all users, male users, weekend users, California users, etc.). In some cases, the segment might represent a given marketing channel (e.g., display, search, TV, etc.) and/or device platform (e.g., mobile, desktop, etc.). Further, a marketing manager (e.g., manager $104_1$) can use the touchpoint contributions 266 to further allocate spend among the various touchpoints by selecting associated touchpoint spend allocation values (see step 254). For example, the manager $104_1$ might apply an overall marketing budget (e.g., in US$) for digital media channels to the various intra-channel touchpoints. In some cases, the manager $104_1$ can allocate the budget according to the relative touchpoint contributions presented in the touchpoint contributions 266 to produce certain instances of touchpoint spend allocations 268 as shown. In other cases, the touchpoint spend allocations 268 can be automatically generated based on the touchpoint contributions 266.

Further details regarding a general approach to allocating a budget according to relative touchpoint contributions are described in U.S. application Ser. No. 14/145,521 filed Dec. 31, 2013, entitled, "MARKETING PORTFOLIO OPTIMIZATION" which is hereby incorporated by reference in their entirety.

Figure 3C:
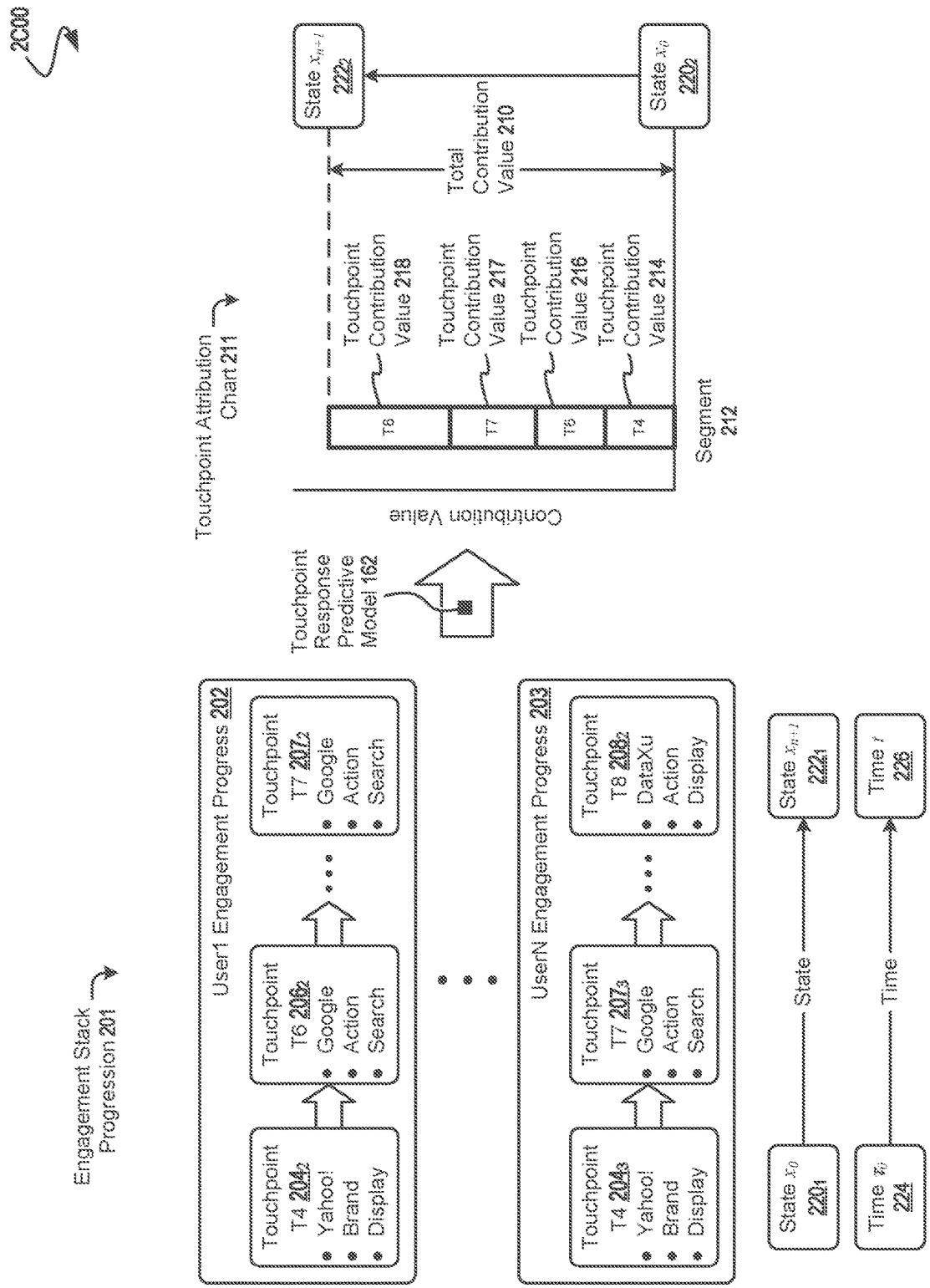
FIG. 3C illustrates a touchpoint attribution technique, according to some embodiments.

Embodiments of certain data structures used by the touchpoint response predictive modeling technique 2A00 are described in FIG. 3B and FIG. 3C.

FIG. 3B presents a touchpoint attribute chart 2B00 showing sample attributes associated with touchpoints of a media campaign. As an option, one or more instances of touchpoint attribute chart 2B00 or any aspect thereof may be implemented in the context of the architecture and functionality of the embodiments described herein. Also, the touchpoint attribute chart 2B00 or any aspect thereof may be implemented in any desired environment.

As discussed herein, a touchpoint (e.g., touchpoints 157) can be any occurrence where a user interacts with any aspect of a media campaign (e.g., display ad, keyword search, TV ad, etc.). Recording the various stimulation and response touchpoints associated with a marketing campaign can enable certain key performance indicators (KPIs) for the campaign to be determined. For example, touchpoint information might be captured in the stimulus data records 172, the response data records 174, the cross-device mapping data records, the fragmented user engagement stacks 178, the cross-device user engagement stacks 184, and/or other data records for use by the herein disclosed techniques. Yet, some touchpoints are more readily observed than other touchpoints. Specifically, touchpoints in non-digital media channels might not be observable at a user level and/or an individual transaction level, such that summary and/or aggregate responses in non-digital channels are provided. In comparison, touchpoints in digital media channels can be captured real-time at a user level (e.g., using Internet technology). The attributes of such touchpoints in digital media channels can be structured as depicted in the touchpoint attribute chart 2B00.

Specifically, the touchpoint attribute chart 2B00 shows a plurality of touchpoints (e.g., touchpoint T4 $204_1$, touchpoint T16 $206_1$, touchpoint T7 $207_1$, touchpoint T8 $208_1$, touchpoint T5 $205_1$, and touchpoint T9 $209_1$) that might be collected and stored (e.g., in response data store 236) for various analyses (e.g., at measurement server 110, apportionment server 111, etc.). The example dataset of touchpoint attribute chart 2B00 maps the various touchpoints with a plurality of attributes 232 associated with respective touchpoints. For example, the attribute "Channel" identifies the type of channel (e.g., "Display", "Search") that delivers the touchpoint, the attribute "Message" identities the type of message (e.g., "Brand". "Call to Action") delivered in the touchpoint, and so on. More specifically, as indicated by the "Event" attribute, touchpoint T4 $204_1$ was an "Impression" presented to the user, while touchpoint T6 $206_1$ corresponds to an item (e.g., "Call to Action" for "Digital SLR") the user responded to with a "Click". Also, as represented by the "Indicator" attribute, touchpoint T4 $204_1$ was presented (e.g., as indicated by a "1") in the time window specified by the "Recency" attribute (e.g., "30+ Days"), while touchpoint T9 $209_1$ was not presented (e.g., as indicated by a "0") in the time window specified by the "Recency" attribute (e.g., "<2 hours"). For example, the "Indicator" can be used to distinguish the touchpoints actually exposed to a user (e.g., comprising the stimulus data records 172) as compared to planned touchpoint stimulus. In some cases, the "Indicator" can be used to identify responses to a given touchpoint (e.g., a "1" indicates the user responded with a click, download, etc.). Further, as indicated by the "User" attribute, touchpoint T4 $204_1$ was presented to a user identified as "UUID123", while touchpoint T6 $206_1$ was presented to a user identified as "UUID456". The remaining information in the touchpoint attribute chart 2B00 identifies other attribute values for the plurality of touchpoints.

A measurable relationship between one or more touchpoints and a progression through engagement and/or readiness states towards a target state is possible. In some cases, the relationship between touchpoints is deterministic (e.g., based on UUID). In other cases, the relationship between touchpoints can be probabilistic (e.g., a likelihood that two or more touchpoints are related). Such a collection of touchpoints contributing to reaching the target state (e.g., conversion, brand engagement, etc.) can be called an engagement stack. Indeed, such engagements stacks can be applied to the foregoing touchpoint response predictive modeling technique 2A00 to determine the contribution values of touchpoints (e.g., touchpoint contributions 266) associated with certain desired responses, such as conversion events, brand engagement events, and/or other events. When analyzing the impact of touchpoints on a user's engagement progression and possible execution of the target response event, a time-based progression view of the touchpoints and a contribution value of the touchpoints (e.g., touchpoint attribution) can be considered as shown in FIG. 3C.

FIG. 3C illustrates a touchpoint attribution technique 2C00. As an option, one or more instances of touchpoint attribution technique 2C00 or any aspect thereof may be implemented in the context of the architecture and functionality of the embodiments described herein. Also, the touchpoint attribution technique 2C00 or any aspect thereof may be implemented in any desired environment.

The touchpoint attribution technique 2C00 illustrates an engagement stack progression 201 that is transformed by the touchpoint response predictive model 162 to a touchpoint attribution chart 211. Specifically, the engagement stack progression 201 depicts a progression of touchpoints experienced by one or more users. More specifically, a User1 engagement progress 202 and a UserN engagement progress 203 are shown as representative of a given audience (e.g., comprising User1 to UserN). The User1 engagement progress 202 and the UserN engagement progress 203 represent the user's progress from a state $x_0$ $220_1$ to a state $x_{n+1}$ $222_1$ over a time $\tau_0$ 224 to a time t 226. For example, the state $x_0$ $220_1$ can represent an initial user engagement state (e.g., no engagement) and the state $x_{n+1}$ $222_1$ can represent a final user engagement state (e.g., conversion, brand engagement event, etc.). Further, the time $\tau_0$ 224 to the time t 226 can represent a measurement time window for performing touchpoint attribution analyses. As shown in User1 engagement progress 202, User1 might experience a touchpoint T4 $204_2$ comprising a branding display creative published by Yahoo!. At some later moment, User1 might experience a touchpoint T6 $206_2$ comprising Google search results (e.g., search keyword "Digital SLR") prompting a call to action. At yet another moment later in time, User1 might experience a touchpoint T7 $207_2$ comprising Google search results (e.g., search keyword "Best Rated Digital Camera") also prompting a call to action. Also as shown in UserN engagement progress 203, UserN might experience a touchpoint T4 $204_3$ having the same attributes as touchpoint T4 $204_2$. At some later moment, UserN might experience a touchpoint T7 $207_3$ having the same attributes as touchpoint T7 $207_2$. At yet another moment later in time, UserN might experience a touchpoint T8 $208_2$ comprising a call-to-action display creative published by DataXu. Any number of timestamped occurrences of these touchpoints and/or additional information pertaining to the touchpoints and/or user responses to the touchpoints (e.g., captured in attributes 232), can be received over the network in real time for use in generating the touchpoint response predictive model 162 and/or generating the touchpoint attribution chart 211.

Specifically, the touchpoint attribution chart 211 shows the touchpoint contribution values (e.g., touchpoint contribution value 214, touchpoint contribution value 216, touchpoint contribution value 217, and touchpoint contribution value 218) of all instances of the respective touchpoints (e.g., touchpoint T4, touchpoint T6, touchpoint T7, and touchpoint T8, respectively) aggregated over a segment 212. In some cases, the segment 212 might comprise a certain group of users (e.g., an audience of N users, all male users age 18-25, etc.). In other cases, the segment 212 might be associated with a certain media channel (e.g., display, search, radio, print, email, etc.) and/or delivery platform (e.g., desktop, mobile, etc.). The overall contribution value of the touchpoints pertaining to the segment 212 is defined by a total contribution value 210. Various techniques (e.g., the touchpoint response predictive modeling technique 2A00) can determine the contribution value from the available touchpoint data (e.g., stimulus data records 172, response data records 174, etc.). As shown, the contribution values indicate a measure of the influence (e.g., lift, contribution, conversion credit, etc.) attributed to a respective touchpoint in transitioning a user in the segment 212 from state $x_0$ 220$_2$ to state $x_{n+1}$ 222$_2$.

The touchpoint attribution technique 2C00 can be applied to cross-device user engagement stacks to implement cross-device marketing touchpoint attribution as disclosed herein. One embodiment of a technique for generating cross-device user engagement stacks is described as pertains to FIG. 4.

Figure 4:
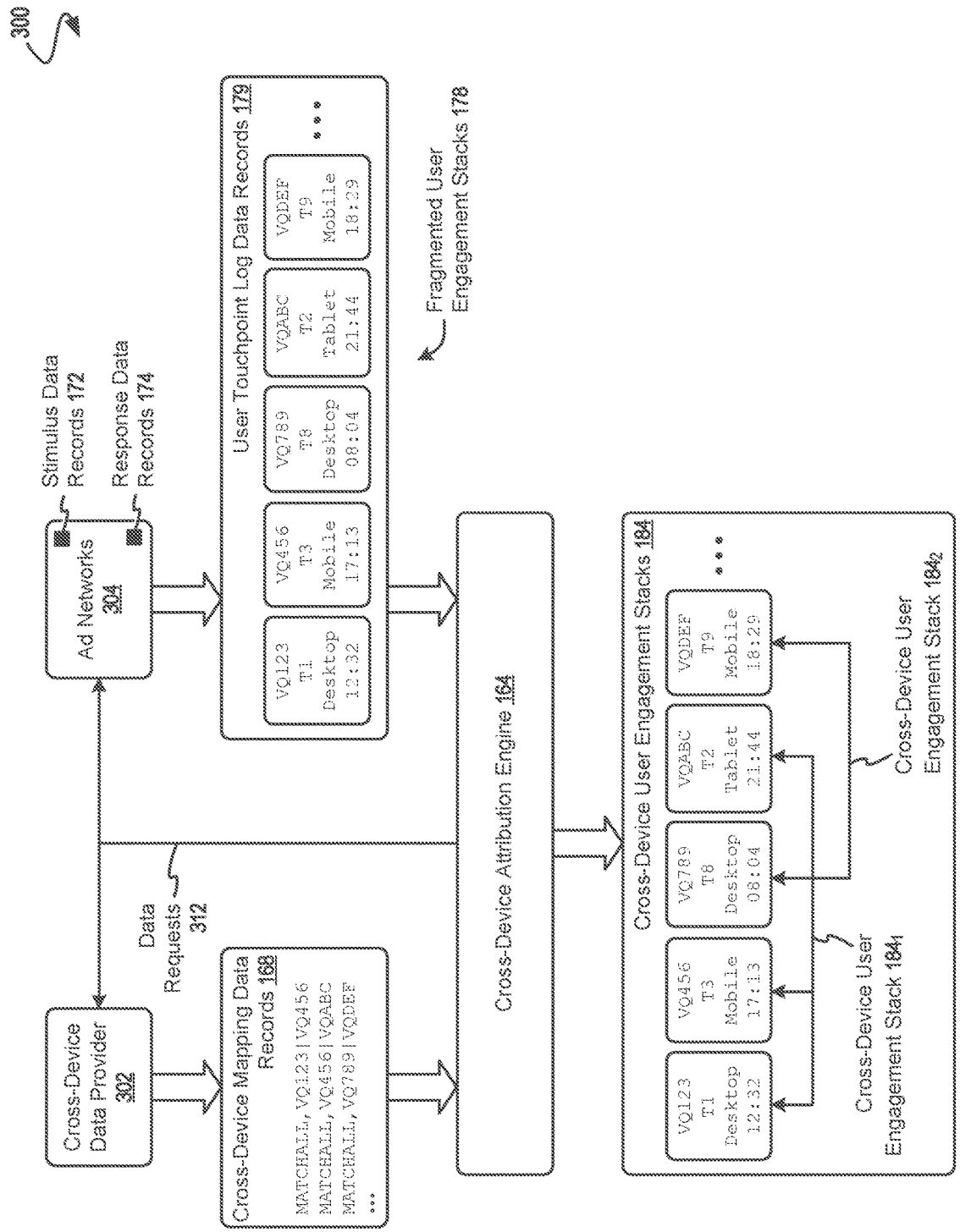
FIG. 4 presents a cross-device engagement stack joining technique used in systems for cross-device marketing touchpoint attribution, according to some embodiments.

FIG. 4 presents a cross-device engagement stack joining technique 300 used in systems for cross-device marketing touchpoint attribution. As an option, one or more instances of cross-device engagement stack joining technique 300 or any aspect thereof may be implemented in the context of the architecture and functionality of the embodiments described herein. Also, the cross-device engagement stack joining technique 300 or any aspect thereof may be implemented in any desired environment.

The embodiment shown in FIG. 4 depicts the cross-device engagement stack joining technique 300 implemented by the cross-device attribution engine 164 to generate the cross-device user engagement stacks 184 for cross-device marketing touchpoint attribution. Specifically, the cross-device attribution engine 164 can use a set of cross-device mapping data records 168 and/or a set of fragmented user engagement stacks 178 to generate the cross-device user engagement stacks 184. More specifically, the cross-device mapping data records 168 might be received by the cross-device attribution engine 164 from a cross-device data provider 302. Further, the fragmented user engagement stacks 178 might be derived from a set of user touchpoint log data records 179 received from one or more ad networks 304. For example, the user touchpoint log data records 179 might be included in the stimulus data records 172 and/or the response data records 174 further provided by the ad networks 304. In some cases, the cross-device data provider 302 and/or the ad networks 304 can be polled continuously and/or at various times using instances of data requests 312 (e.g., HTTP requests) to collect the most relevant (e.g., most recent) set of data records for use in generating the cross-device user engagement stacks 184.

As shown, the structure and information in the cross-device mapping data records 168 can indicate the identifiers (e.g., vQ123, vQ456, etc.) that have been determined, in part, by various cross-device mapping techniques, to be associated with the same user. In one or more embodiments, such identifiers can be created for the purposes of cross-device mapping such that no personally identifiable information (PII) and/or only non-personally identifiable information (NPII) is transferred to the cross-device attribution engine 164. For example, the line "MATCHALL, VQ123|VQ456" in the cross-device mapping data records 168 can indicate that a user identifier VQ123 associated with a first user device has been determined to be mapped to a user identifier VQ456 associated with a second user device. Likewise, the cross-device mapping data records 168 indicates a user identifier VQ456 is mapped to a user identifier VQABC, and a user identifier VQ789 is mapped to a user identifier VQDEF. By the associative property, the user identifier VQ123 is also mapped to the user identifier VQABC.

As further shown in FIG. 4, the structure and information in the user touchpoint log data records 179 can indicate certain information pertaining a touchpoint exposure event for a given user. For illustrative purposes, representative attributes characterizing the touchpoint exposure event are shown. Specifically, each instance of the user touchpoint log data records 179 comprises an identifier, a touchpoint identifier, a device identifier, and an event timestamp. In one or more embodiments, the user identifiers in the user touchpoint log data records 179 can correspond to the identifiers used in the cross-device mapping data records 168 to facilitate implementation of the herein disclosed techniques.

For example, a user represented by the identifier VQ123 was exposed to touchpoint T1 on a Desktop computer at time 12:23. As another example, a user represented by the identifier VQABC was exposed to touchpoint T9 on a Mobile device at time 18:29. As shown, none of the identifiers in the user touchpoint log data records 179 are matching, yet some logs might be associated with a single user. In such cases, the user touchpoint log data records 179 can comprise fragmented cross-device touchpoints and/or fragmented user engagement stacks 178.

The cross-device engagement stack joining technique 300 and/or other techniques disclosed herein can address such problems pertaining to associating the fragmented cross-device touchpoints and/or fragmented user engagement stacks 178. Specifically, the cross-device attribution engine 164 can apply the cross-device mapping data records 168 to the user touchpoint log data records 179 to determine one or more instances of cross-device user engagement stacks 184. For example, as shown, the logs for identifiers VQ123, VQ456, and VQABC are mapped together in a cross-device user engagement stack 184$_1$, and the logs for identifiers VQ789 and VQDEF are mapped together in a cross-device user engagement stack 184$_2$. Such instances of cross-device user engagement stacks 184 can then be used by the cross-device attribution engine 164 and/or other components of systems implementing the herein disclosed techniques to provide cross-device marketing touchpoint attribution. One embodiment of such systems is discussed as pertains to FIG. 5A.

Figure 5A:
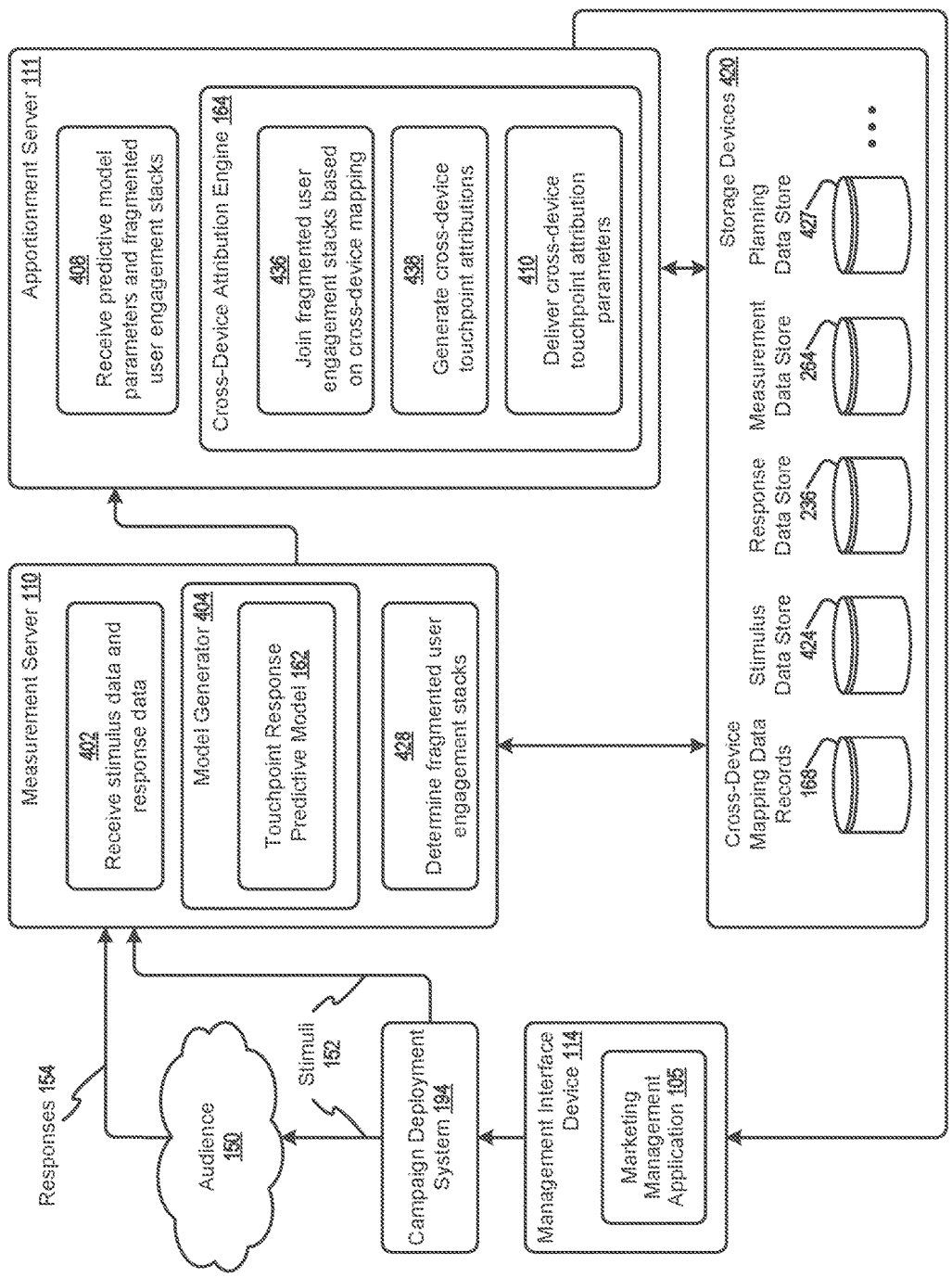
FIG. 5A depicts a subsystem for cross-device marketing touchpoint attribution, according to some embodiments.

FIG. 5A depicts a subsystem 4A00 for cross-device marketing touchpoint attribution. As an option, one or more instances of subsystem 4A00 or any aspect thereof may be implemented in the context of the architecture and functionality of the embodiments described herein. Also, the subsystem 4A00 or any aspect thereof may be implemented in any desired environment.

As shown, subsystem 4A00 comprises certain components earlier described in FIG. 1A, FIG. 1B, and/or FIG. 1C. Specifically, the campaign deployment system 194 can present the stimuli 152 to the audience 150 to produce the responses 154. The measurement server 110 can receive electronic data records associated with the stimuli 152 and responses 154 (see operation 402). The stimulus data and response data can be stored in one or more storage devices 420 (e.g., stimulus data store 424, response data store 236, etc.). The measurement server 110 further comprises a model generator 404 that can use the stimulus data, response data, and/or other data to generate the touchpoint response predictive model 162. In some embodiments, the model parameters (e.g., touchpoint response predictive model parameters 176) characterizing the touchpoint response predictive model 162 can be stored in the measurement data store 264. The measurement server 110 can further determine one or more user engagement stacks based on the fragmented cross-device touchpoint information included in the stimulus data and/or response data (see operation 428).

As shown, the apportionment server 111 can receive the predictive model parameters and information describing the fragmented user engagement stacks from the measurement server 110 (see operation 408). An instance of the cross-device attribution engine 164 operating on the apportionment server 111 can join the fragmented user engagement stacks based on cross-device mapping (e.g., from cross-device mapping data records 168) to form a set of cross-device user engagement stacks (see operation 436). Such cross-device user engagement stacks can be used by the cross-device attribution engine 164 to generate cross-device touchpoint attributions (see operation 438). Cross-device touchpoint attribution parameters characterizing the cross-device touchpoint attributions can be delivered (see operation 410) to the marketing management application 105 operating on the management interface device 114 to facilitate the development of media spend plans. In one or more embodiments, the data representing such media spend plans can be stored in a planning data store 427.

The subsystem 4A00 presents merely one partitioning. The specific example shown where the measurement server 110 comprises the model generator 404, and where the apportionment server 111 comprises the cross-device attribution engine 164 is purely exemplary, and other partitioning is reasonable, and the partitioning may be defined in part by the volume of empirical data. In some cases, a database engine can serve to perform calculations (e.g., within, or in conjunction with a database engine query). A technique for cross-device marketing touchpoint attribution implemented in such systems, subsystems, and partitionings is shown in FIG. 5B.

Figure 5B:
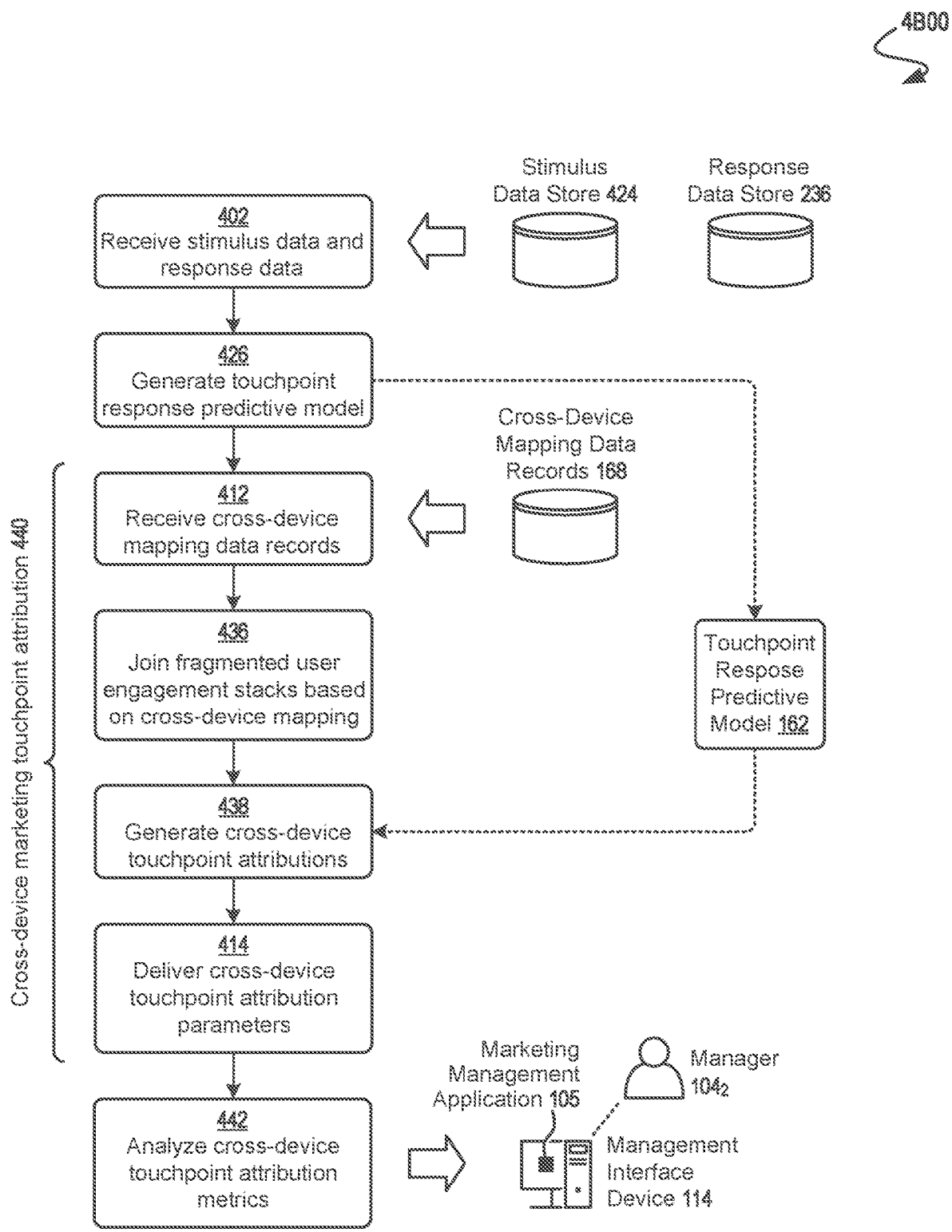
FIG. 5B presents a flow chart for cross-device marketing touchpoint attribution, according to some embodiments.

FIG. 5B presents a flow chart 4B00 for cross-device marketing touchpoint attribution. As an option, one or more instances of flow chart 4B00 or any aspect thereof may be implemented in the context of the architecture and functionality of the embodiments described herein. Also, the flow chart 4B00 or any aspect thereof may be implemented in any desired environment.

The flow chart 4B00 presents one embodiment of certain steps for cross-device marketing touchpoint attribution. In one or more embodiments, the steps and underlying operations shown in the flow chart 4B00 can be executed by the measurement server 110 and apportionment server 111 disclosed herein. As shown, the flow chart 4B00 can commence with receiving stimulus data and response data from various sources (see operation 402), such as the stimulus data store 424 and/or the response data store 236. Using the aforementioned received data and/or other data, stimulus attribution predictive model such as the touchpoint response predictive model 162 can be generated (see operation 426).

The flow chart 4B00 can continue with a set of steps and/or operations for cross-device marketing touchpoint attribution (see grouping 440). Specifically, a set of cross-device mapping data records (e.g., cross-device mapping data records 168) can be received (see step 412). A set of fragmented user engagement stacks can then be joined using the cross-device mapping data records (see operation 436). The resulting cross-device user engagement stacks can be applied to the touchpoint response predictive model to generate cross-device touchpoint attributions (see operation 438). Cross-device touchpoint attribution parameters characterizing the cross-device touchpoint attributions can be delivered (see operation 414) to facilitate the analysis of certain cross-device touchpoint attribution metrics (see operation 442). For example, the marketing manager 104$_2$ might interface with the marketing management application 105 on the management interface device 114 to analyze such metrics. In one or more embodiments, a portion of such application interfaces can be represented as shown in FIG. 5A, FIG. 5B, and FIG. 5C.

Figure 6A:
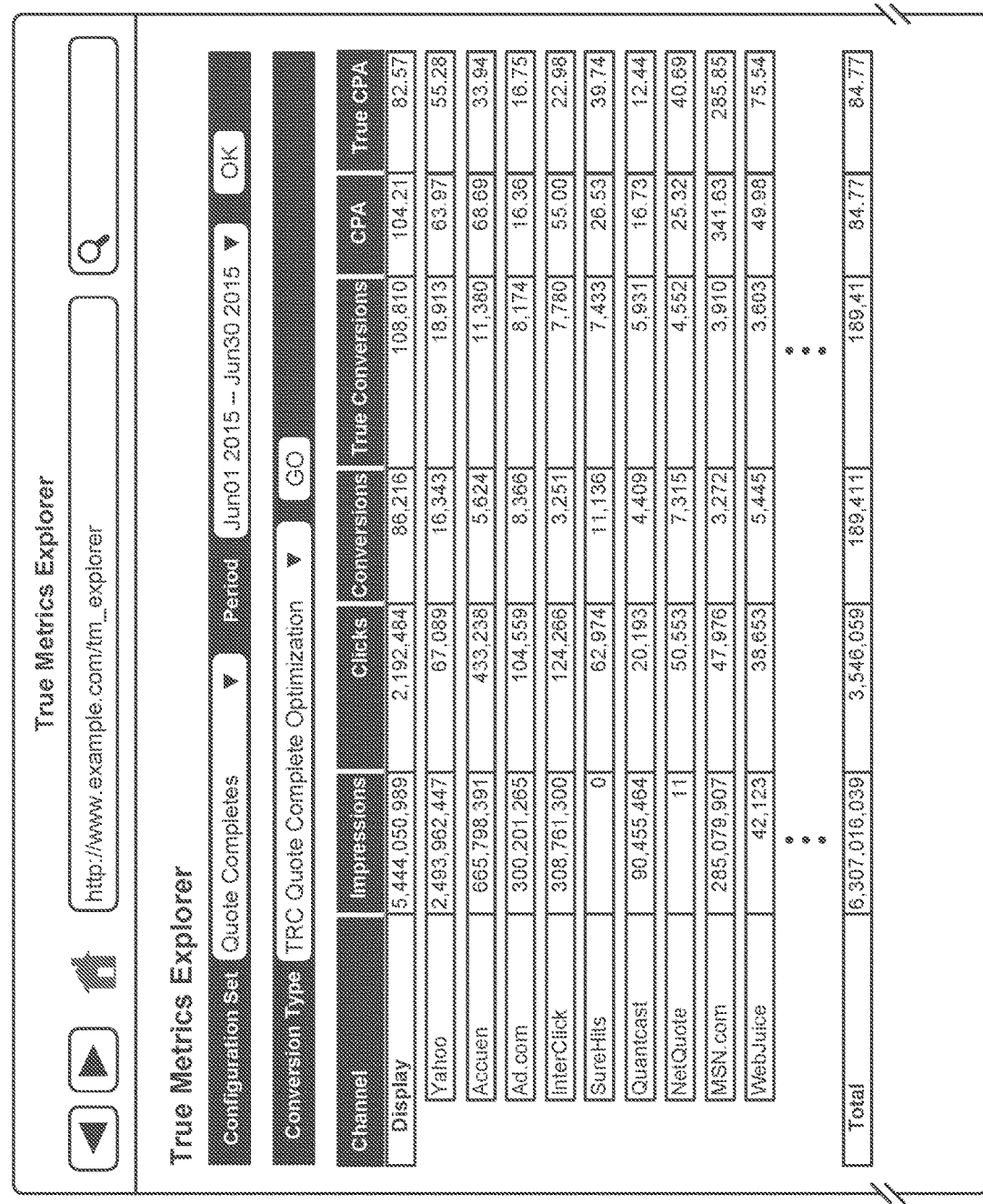
FIG. 6A presents a channel attribution metrics interface used in systems for cross-device marketing touchpoint attribution, according to some embodiments.

FIG. 6A presents a channel attribution metrics interface 5A00 used in systems for cross-device marketing touchpoint attribution. As an option, one or more instances of channel attribution metrics interface 5A00 or any aspect thereof may be implemented in the context of the architecture and functionality of the embodiments described herein. Also, the channel attribution metrics interface 5A00 or any aspect thereof may be implemented in any desired environment.

In one or more embodiments, the channel attribution metrics interface 5A00 can enable a user (e.g., a marketing manager) to analyze digital channel performance metrics that are derived from cross-device marketing touchpoint attribution. For example, as shown, for a given time period, the user can view certain performance metrics (e.g., impressions, clicks, conversions, true conversions, CPA, true CPA, etc.) associated with various publishers in the online display channel. Specifically, using the herein disclosed techniques, true conversions and true CPA can account for all media across all devices.

Figure 6B:
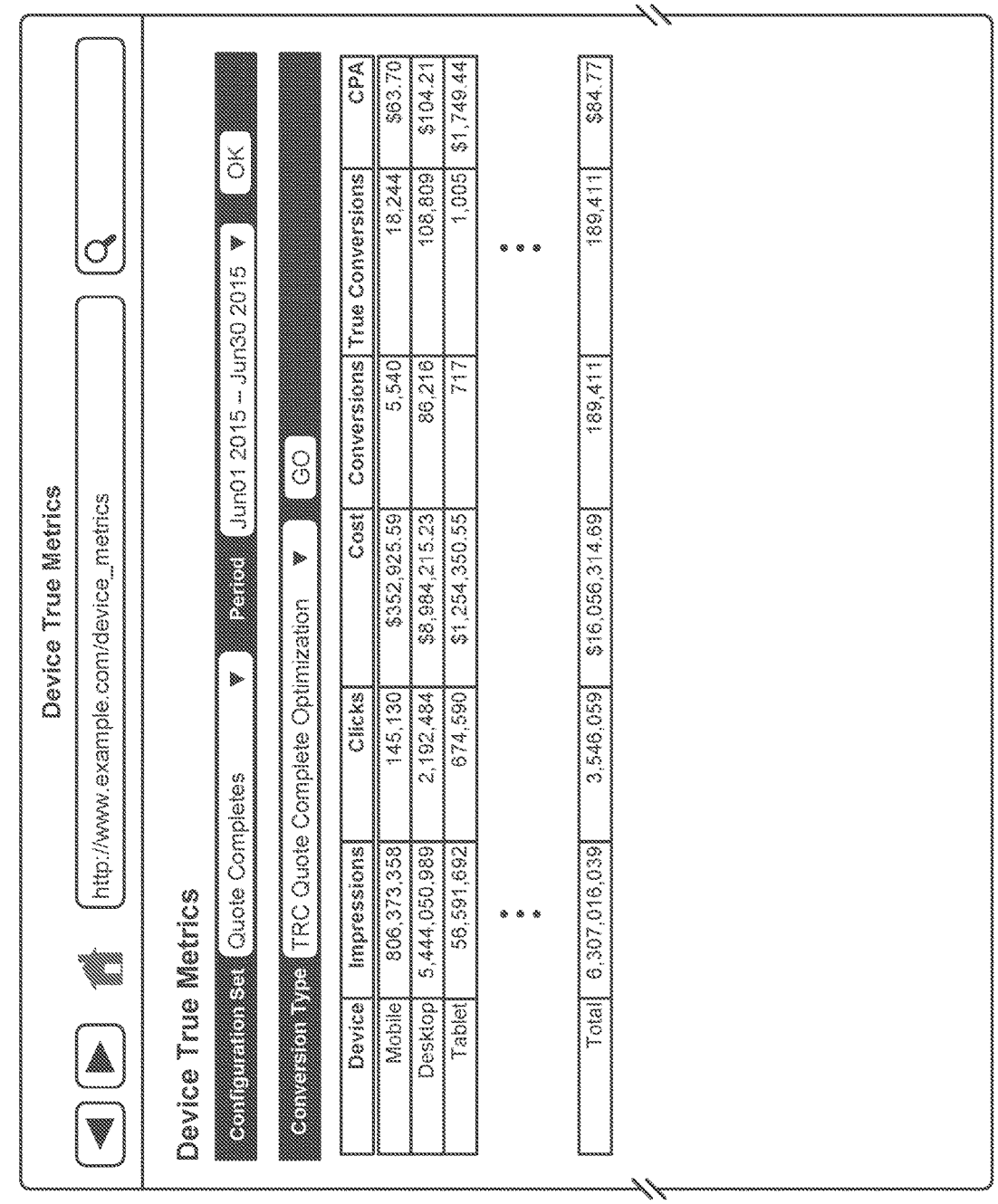
FIG. 6B presents a device attribution metrics interface used in systems for cross-device marketing touchpoint attribution, according to some embodiments.

FIG. 6B presents a device attribution metrics interface 5B00 used in systems for cross-device marketing touchpoint attribution. As an option, one or more instances of device attribution metrics interface 5B00 or any aspect thereof may be implemented in the context of the architecture and functionality of the embodiments described herein. Also, the device attribution metrics interface 5B00 or any aspect thereof may be implemented in any desired environment.

In one or more embodiments, the device attribution metrics interface 5B00 can enable a user (e.g., a marketing manager) to analyze device platform performance metrics derived from cross-device marketing touchpoint attribution. For example, as shown, certain performance metrics (e.g., impressions, clicks, cost, conversions, true conversions, CPA, etc.) can be viewed for a given device type, such as mobile, desktop, tablet, and/or other device types. In accordance with the scenario 1A00 earlier described, true conversions for mobile (e.g., 18,224.58) and tablet (e.g., 1,005.68) using the herein disclosed techniques might increase (e.g., as compared to conversions of 5,540.00 and 717.00, respectively) as conversion credit is transferred from desktop, brand equity, and/or another category.

FIG. 6C presents a category lift metrics interface 5C00 used in systems for cross-device marketing touchpoint attribution. As an option, one or more instances of category lift metrics interface 5C00 or any aspect thereof may be implemented in the context of the architecture and functionality of the embodiments described herein. Also, the category lift metrics interface 5C00 or any aspect thereof may be implemented in any desired environment.

In one or more embodiments, the category lift metrics interface 5C00 can enable a user (e.g., a marketing manager) to analyze category lift performance metrics derived from cross-device marketing touchpoint attribution. For example, as shown, certain performance metrics (e.g., converters, reach, converter rate, lift, etc.) can be viewed for a given media category (e.g., desktop, mobile, unclassified paid search (PS), unclassified display, etc.). For example, the category lift metrics interface 5C00 might present metrics that quantify the effectiveness of mobile in contributing to conversions on desktop. Further, as user engagement stacks are joined using the herein disclosed techniques, the estimated reach metric may decrease since multiple fragmented "users" might be combined into fewer unique users. Also, the herein disclosed techniques may result in an increase in the number of converters seeing media as converters previously attributed to brand equity might be determined to have been exposed to mobile touchpoints.

Additional Practical Application Examples

Figure 7:
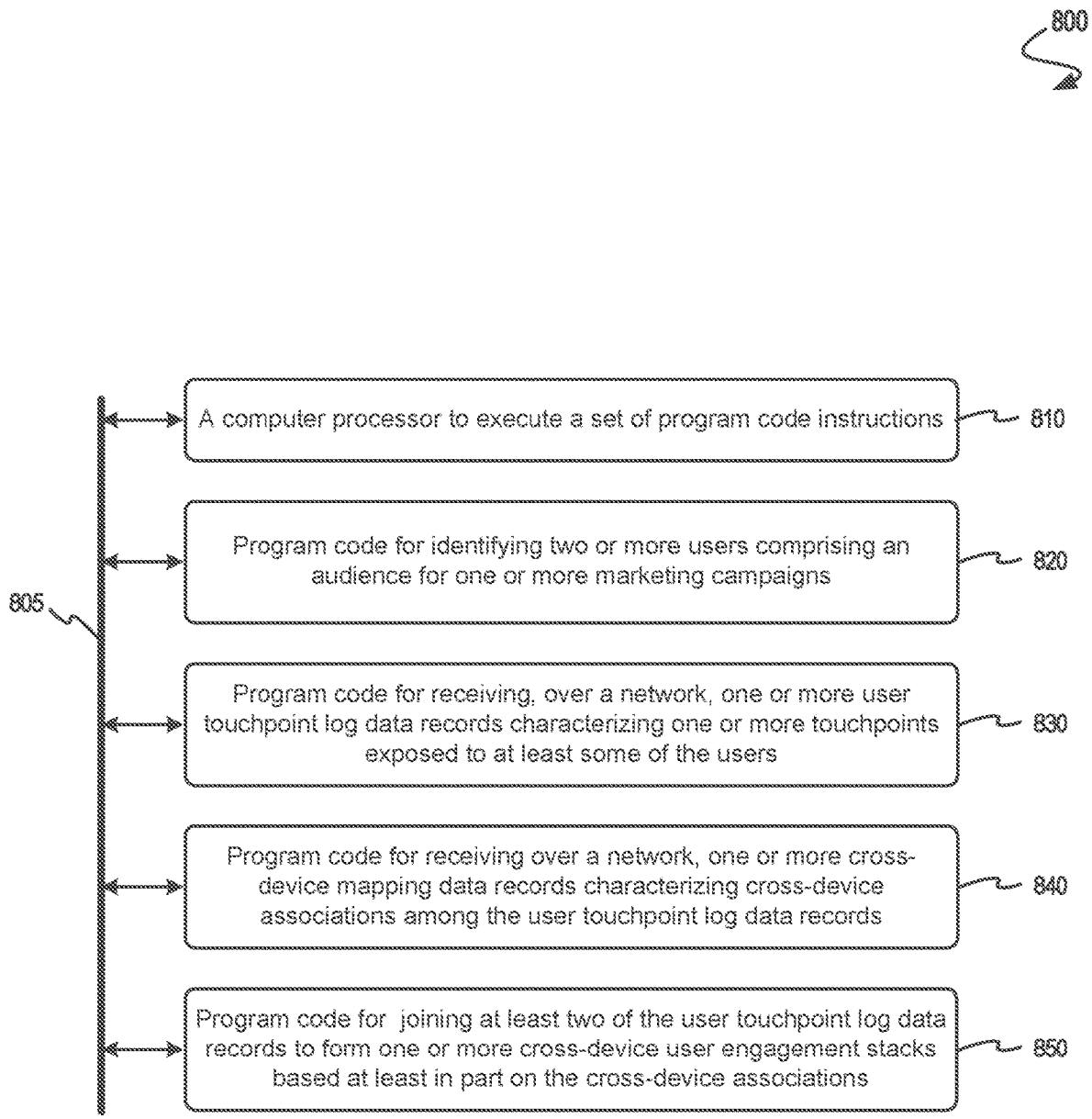
FIG. 7 is a block diagram of a system for cross-device marketing touchpoint attribution, according to an embodiment.

FIG. 7 is a block diagram of a system for cross-device marketing touchpoint attribution, according to an embodiment. As an option, the present system 800 may be implemented in the context of the architecture and functionality of the embodiments described herein. Of course, however, the system 800 or any operation therein may be carried out in any desired environment. The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The shown embodiment implements a portion of a computer system, presented as system 800, comprising a computer processor to execute a set of program code instructions (see module 810) and modules for accessing memory to hold program code instructions to perform: identifying two or more users comprising an audience for one or more marketing campaigns (see module 820); receiving, over a network, one or more user touchpoint log data records characterizing one or more touchpoints exposed to at least some of the users (see module 830); receiving over a network, one or more cross-device mapping data records characterizing cross-device associations among the user touchpoint log data records (see module 840); and joining at least two of the user touchpoint log data records to form one or more cross-device user engagement stacks based at least in part on the cross-device associations (see module 850).

Additional System Architecture Examples

FIG. 8A depicts a diagrammatic representation of a machine in the exemplary form of a computer system 7A00 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 7A00 includes one or more processors (e.g., processor $702_1$, processor $702_2$, etc.), a main memory comprising one or more main memory segments (e.g., main memory segment $704_1$, main memory segment $704_2$, etc.), one or more static memories (e.g., static memory $706_1$, static memory $706_2$, etc.), which communicate with each other via a bus 708. The computer system 7A00 may further include one or more video display units (e.g., display unit $710_1$, display unit $710_2$, etc.), such as an LED display, or a liquid crystal display (LCD), or a cathode ray tube (CRT). The computer system 7A00 can also include one or more input devices (e.g., input device $712_1$, input device $712_2$, alphanumeric input device, keyboard, pointing device, mouse, etc.), one or more database interfaces (e.g., database interface $714_1$, database interface $714_2$, etc.), one or more disk drive units (e.g., drive unit $716_1$, drive unit $716_2$, etc.), one or more signal generation devices (e.g., signal generation device $718_1$, signal generation device $718_2$, etc.), and one or more network interface devices (e.g., network interface device $720_1$, network interface device $720_2$, etc.).

The disk drive units can include one or more instances of a machine-readable medium 724 on which is stored one or more instances of a data table 719 to store electronic information records. The machine-readable medium 724 can further store a set of instructions $726_0$ (e.g., software) embodying any one, or all, of the methodologies described above. A set of instructions $726_1$ can also be stored within the main memory (e.g., in main memory segment $704_1$). Further, a set of instructions $726_2$ can also be stored within the one or more processors (e.g., processor $702_1$). Such instructions and/or electronic information may further be transmitted or received via the network interface devices at one or more network interface ports (e.g., network interface port $723_1$, network interface port $723_2$, etc.). Specifically, the network interface devices can communicate electronic information across a network using one or more optical links, Ethernet links, wireline links, wireless links, and/or other electronic communication links (e.g., communication link $722_1$, communication link $722_2$, etc.). One or more network protocol packets (e.g., network protocol packet $721_1$, network protocol packet $721_2$, etc.) can be used to hold the electronic information (e.g., electronic data records) for transmission across an electronic communications network (e.g., network 748). In some embodiments, the network 748 may include, without limitation, the web (i.e., the Internet), one or more local area networks (LANs), one or more wide area networks (WANs), one or more wireless networks, and/or one or more cellular networks.

The computer system 7A00 can be used to implement a client system and/or a server system, and/or any portion of network infrastructure.

It is to be understood that various embodiments may be used as or to support software programs executed upon some form of processing core (such as the CPU of a computer) or otherwise implemented or realized upon or within a machine or computer readable medium. A machine-readable medium includes any mechanism for storing or transmitting information in a form readable by a machine (e.g., a computer). For example, a machine-readable medium includes read-only memory (ROM); random access memory (RAM); magnetic disk storage media, optical storage media; flash memory devices; or any other type of non-transitory media suitable for storing or transmitting information.

A module as used herein can be implemented using any mix of any portions of the system memory, and any extent of hard-wired circuitry including hard-wired circuitry embodied as one or more processors (e.g., processor $702_1$, processor $702_2$, etc.).

Figure 8B:
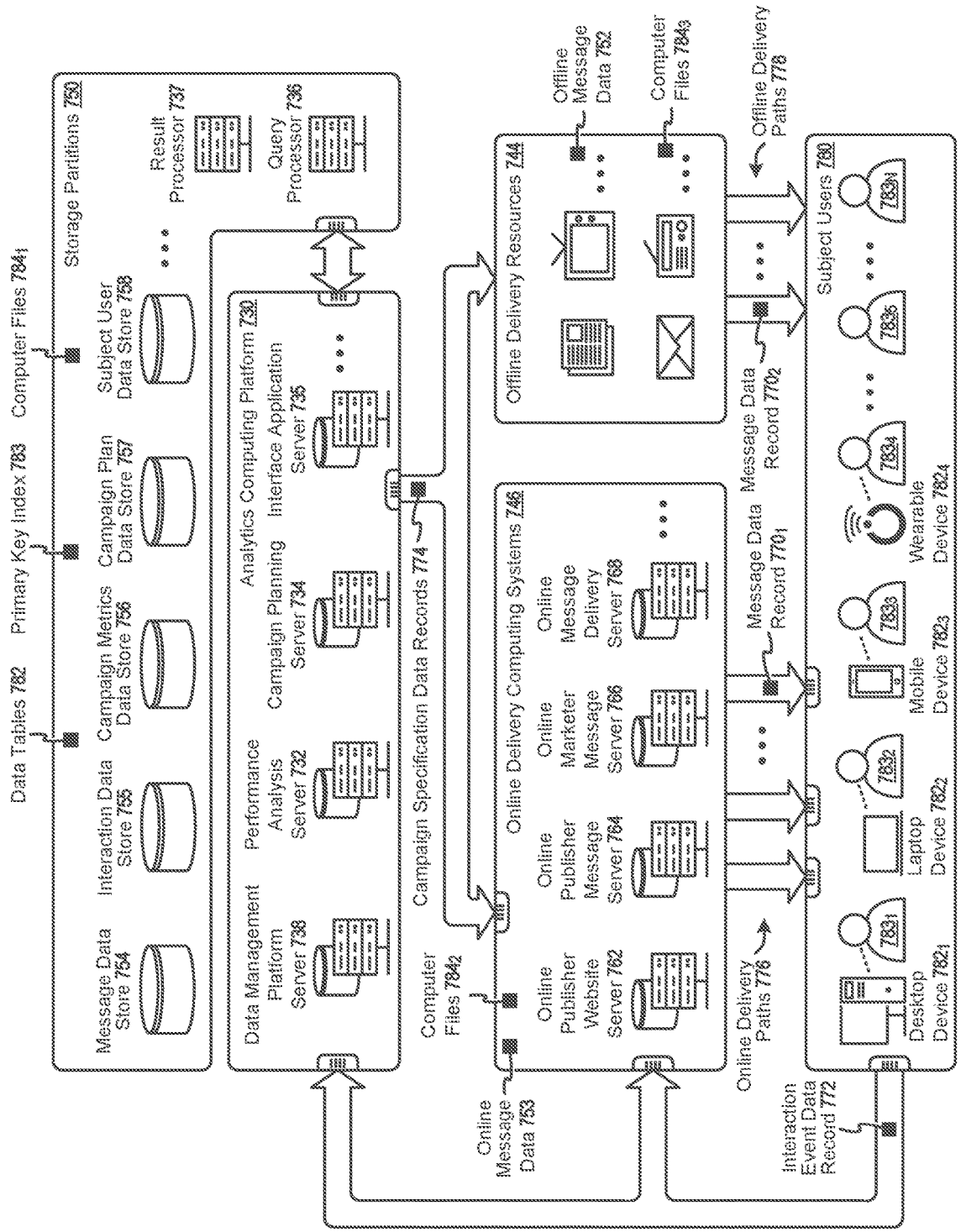

FIG. 8B depicts a block diagram of a data processing system suitable for implementing instances of the herein-disclosed embodiments. The data processing system may include many more or fewer components than those shown.

The components of the data processing system may communicate electronic information (e.g., electronic data records) across various instances and/or types of an electronic communications network (e.g., network 1048) using one or more electronic communication links (e.g., communication link $722_1$, communication link $722_2$, etc). Such communication links may further use supporting hardware, such as modems, bridges, routers, switches, wireless antennas and towers, and/or other supporting hardware. The various communication links transmit signals comprising data and commands (e.g., electronic data records) exchanged by the components of the data processing system, as well as any supporting hardware devices used to transmit the signals. In some embodiments, such signals are transmitted and received by the components at one or more network interface ports (e.g., network interface port $723_1$, network interface port $723_2$, etc.). In one or more embodiments, one or more network protocol packets (e.g., network protocol packet $721_1$, network protocol packet $721_2$, etc.) can be used to hold the electronic information comprising the signals.

As shown, the data processing system can be used by one or more advertisers to target a set of subject users 780 (e.g., user $783_1$, user $783_2$, user $783_3$, user $783_4$, user $783_5$, to user $783_N$) in various marketing campaigns. The data processing system can further be used to determine, by an analytics computing platform 730, various characteristics (e.g., performance metrics, etc.) of such marketing campaigns.

In some embodiments, the interaction event data record 772 comprises bottom up data suitable for computing, in performance analysis server 732, bottom up attribution. In other embodiments, the interaction event data record 772 and offline message data 752 comprise top down data suitable for computing, in performance analysis server 732, top down attribution. In yet other embodiments, the interaction event data record 772 and offline message data 752 comprises data suitable for computing, in performance analysis server 732, both bottom up and top down attribution.

The interaction event data record 772 comprises, in part, a plurality of touchpoint encounters that represent the subject users 780 exposure to marketing message(s). Each of these touchpoint encounters comprises a number of attributes, and each attribute comprises an attribute value. For example, the time of day during which the advertisement appeared, the frequency with which it was repeated, and the type of offer being advertised are all examples of attributes for a touchpoint encounter. Each attribute of a touchpoint may have a range of values. The attribute value range may be fixed or variable. For example, the range of attribute values for a day of the week attribute would be seven, whereas the range of values for a weather attribute may depend on the level of specificity desired. The attribute values may be objective (e.g., timestamp) or subjective (e.g., the relevance of the advertisement to the day's news cycle). For a "Publisher" attribute example (i.e., publisher of the marketing message), some examples of attribute values may be "Yahoo! Inc.", "WSI.com", "Seeking Alpha", "NY Times Online", "CBS Matchwatch", "MSN Money", "CBS Interactive", "YuMe" and "IH Remnant."

The interaction event data record 772 may pertain to various touchpoint encounters for an advertising or marketing campaign and the subject users 780 who encountered each touchpoint. The interaction event data record 772 may include entries that list each instance of a consumer's encounter with a touchpoint and whether or not that consumer converted. The interaction event data record 772 may be gathered from a variety of sources, such as Internet advertising impressions and responses (e.g., instances of an advertisement being serve to a user and the user's response, such as clicking on the advertisement). Offline message data 752, such as conversion data pertaining to television, radio, or print advertising, may be obtained from research and analytics agencies or other external entities that specialize in the collection of such data.

According to one embodiment, to compute bottom up attribution in performance analysis server 732, the raw touchpoint and conversion data (e.g., interaction event data record 772 and offline message data 752) is prepared for analysis. For example, the data may be grouped according to touchpoint, user; campaign, or any other scheme that facilitates ease of analysis. All of the subject users 780 that encountered the various touchpoints of a marketing campaign are identified. The subject users 780 are divided between those who converted (i.e., performed a desired action as a result of the marketing campaign) and those who did not convert, and the attributes and attribute values of each touchpoint encountered by the subject users 780 are identified. Similarly, all of the subject users 780 that converted are identified. For each touchpoint encounter, this set of users is divided between those who encountered the touchpoint and those who did not. Using this data, the importance of each attribute of the various advertising touchpoints is determined, and the attributes of each touchpoint are ranked according to importance. Similarly, for each attribute and attribute value of each touchpoint, the likelihood that a potential value of that attribute might influence a conversion is determined.

According to some embodiments, attribute importance and attribute value importance may be modeled, using machine-learning techniques, to generate weights that are assigned to each attribute and attribute value, respectively. In some embodiments, the weights are determined by comparing data pertaining to converting users and non-converting users. In other embodiments, the attribute importance and attribute value importance may be determined by comparing conversions to the frequency of exposures to touchpoints with that attribute relative to others. In some embodiments, logistic regression techniques are used to determine the influence of each attribute and to determine the importance of each potential value of each attribute. Any machine-learning algorithm may be used without deviating from the spirit or scope of the invention.

An attribution algorithm is used and coefficients are assigned for the algorithm, respectively, using the attribute importance and attribute value importance weights. The attribution algorithm determines the relative effect of each touchpoint in influencing each conversion given the attribute weights and the attribute value weights. The attribution algorithm is executed using the coefficients or weights. According to one embodiment, for each conversion, the attribution algorithm outputs a score for every touchpoint that a user encountered prior to converting, wherein the score represents the touchpoint's relative influence on the user's decision to convert. The attribution algorithm, which calculates the contribution of the touchpoint to the conversion, may be expressed as a function of the attribute importance (e.g., attribute weights) and attribute value lift (e.g., attribute value weights):

$$\text{Credit Fraction} = \Sigma_{a=1}^{n} f(\text{attribute importance}_a, \text{attribute value lift}_a)$$

wherein, "a" represents the attribute and "n" represents the number of attributes. Further details regarding a general approach to bottom up touchpoint attribution are described in U.S. application Ser. No. 13/492,493 entitled, "A METHOD AND SYSTEM FOR DETERMINING TOUCHPOINT ATTRIBUTION", filed Jun. 8, 2012, now U.S. Pat. No. 9,183,562, the contents of which are incorporated by reference in its entirety in this application.

Performance analysis server 732 may also perform top down attribution. In general, a top down predictive model is used to determine the effectiveness of marketing stimulations in a plurality of marketing channels included in a marketing campaign. Data (interaction event data record 772 and Offline message data 752), comprising a plurality of marketing stimulations and respective measured responses, is used to determine a set of cross-channel weights to apply to the respective measured responses, where the cross-channel weights are indicative of the influence that a particular stimulation applied to a first channel has on the measure responses of other channels. The cross-channel weights are used in calculating the effectiveness of a particular marketing stimulation over an entire marketing campaign. The marketing campaign may comprise stimulations quantified as a number of direct mail pieces, a number or frequency of TV spots, a number of web impressions, a number of coupons printed, etc.

The top down predictive model takes into account cross-channel influence from more spending. For example, the effect of spending more on TV ads might influence viewers to "log in" (e.g., to access a website) and take a survey or download a coupon. The top down predictive model also takes into account counter-intuitive cross-channel effects from a single channel model. For example, additional spending on a particular channel often suffers from measured diminishing returns (e.g., the audience "tunes out" after hearing a message too many times). Placement of a message can reach a "saturation point" beyond which point further desired behavior is not apparent in the measurements in the same channel. However additional spending beyond the single-channel saturation point may correlate to improvements in other channels.

One approach to advertising portfolio optimization uses marketing attributions and predictions determined from historical data (interaction event data record 772 and Offline message data 752). Analysis of the historical data serves to infer relationships between marketing stimulations and responses. In some cases, the historical data comes from "online" outlets, and is comprised of individual user-level data, where a direct cause-effect relationship between stimulations and responses can be verified. However, "offline" marketing channels, such as television advertising, are of a nature such that indirect measurements are used when developing models used in media spend optimization. For example, some stimuli are described as an aggregate (e.g., "TV spots on Prime Time News, Monday, Wednesday and Friday") that merely provides a description of an event or events as a time-series of marketing stimulations (e.g., weekly television advertising spends). Responses to such stimuli are also often measured and/or presented in aggregate (e.g., weekly unit sales reports provided by the telephone sales center). Yet, correlations, and in some cases causality and inferences, between stimulations and responses can be determined via statistical methods.

The top down predictive model considers cross-channel effects even when direct measurements are not available. The top down predictive model may be formed using any machine learning techniques. Specifically, top down predictive model may be formed using techniques where variations (e.g., mixes) of stimuli are used with the learning model to capture predictions of what would happen if a particular portfolio variation were prosecuted. The learning model produces a set of predictions, one set of predictions for each variation. In this manner, variations of stimuli produce predicted responses, which are used in weighting and filtering, which in turn result in a simulated model being output that includes cross-channel predictive capabilities.

In one example, a portfolio schematic includes three types of media, namely TV, radio and print media. Each media type may have one or more spends. For example, TV may include stations named CH1 and CH2. Radio includes a station named KVIQ 212. Print media may comprise distribution in the form of mail, a magazine and/or a printed coupon. For each media, there is one or more stimulations (e.g., S1, S2, . . . SN) and its respective response (e.g., R1, R2, R3 . . . RN). There is a one-to-one correspondence between a particular stimulus and its response. The stimuli and responses discussed herein are often formed as a time-series of individual stimulations and responses, respectively. For notational convenience, a time-series is given as a vector, such as vector S1.

Continuing the discussion of the example portfolio, the portfolio includes spends for TV, such as the evening news, weekly series, and morning show. The portfolio also includes radio spends in the form of a sponsored public service announcement, a sponsored shock jock spot, and a contest. The example portfolio may further include spends for radio station KVIQ, a direct mailer, and magazine print ads (e.g., coupon placement). The portfolio also includes spends for print media in the form of coupons.

The example portfolio may be depicted as stimulus vectors (e.g., S1, S2, S3, S4, S5, S6, S7, S8, and S). The example portfolio may also show a set of response measurements to be taken, such as response vectors (e.g., R1, R2, R3, R4, R5, R6, R7, R8, and RN).

A vector $\overline{S1}$ may be comprised of a time-series. The time-series may be presented in a native time unit (e.g., weekly, daily) and may be apportioned over a different time unit. For example, stimulus S1 corresponds to a weekly spend for "Prime Time News" even though the stimulus to be considered actually occurs nightly (e.g., during "Prime Time News"). The weekly spend stimulus can be apportioned to a nightly stimulus occurrence. In some situations, the time unit in a time-series can be very granular (e.g., by the minute). Apportioning can be performed using any known techniques. Stimulus vectors and response vectors can be formed from any time-series in any time units and can be apportioned to another time-series using any other time units.

A particular stimulus in a first marketing channel (e.g., $\overline{S1}$) might produce corresponding results (e.g., $\overline{R1}$). Additionally, a stimulus in a first marketing channel (e.g., $\overline{S1}$) might produce results (or lack of results) as given by measured results in a different marketing channel (e.g., $\overline{R3}$). Such correlation of results, or lack of results, can be automatically detected, and a scalar value representing the extent of correlation can be determined mathematically from any pair of vectors. In the discussions just below, the correlation of a time-series response vector is considered with respect to a time-series stimulus vector. Correlations can be positive (e.g., the time-series data moves in the same directions), or negative (e.g., the time-series data moves in the opposite directions), or zero (no correlation).

An example vector $\overline{S1}$ is comprised of a series of changing values. The response $\overline{R1}$ may be depicted as a curve. Maximum value correlation occurs when the curve is relatively time-shifted, by $\Delta t$ amount of time, to another. The amount of correlation and amount of time shift can be automatically determined. Example cross-channel correlations are presented in Table 1.

TABLE 1

Cross-correlation examples

| Stimulus Channel →Cross-channel | Description |
|---|---|
| S1 → R2 | No correlation. |
| S1 → R3 | Correlates if time shifted and attenuated |
| S1 → R4 | Correlates if time shifted and amplified |

In some cases, a correlation calculation can identify a negative correlation where an increase in a first channel causes a decrease in a second channel. Further, in some cases, a correlation calculation can identify an inverse correlation where a large increase in a first channel causes a small increase in a second channel. In still further cases, there can be no observed correlation, or in some cases correlation is increased when exogenous variables are considered.

In some cases a correlation calculation can hypothesize one or more causation effects. And in some cases correlation conditions are considered when calculating correlation such that a priori known conditions can be included (or excluded) from the correlation calculations.

The automatic detection can proceed autonomously. In some cases correlation parameters are provided to handle specific correlation cases. In one case, the correlation between two time-series can be determined to a scalar value using Eq. 1.

$$r = \frac{n\sum xy - (\sum x)(\sum y)}{\sqrt{n(\sum x^3) - (\sum x)^3} \sqrt{n(\sum y^2) - (\sum y)^3}} \quad (1)$$

where:
x represents components of a first time-series,
y represents components of a second time-series, and
n is the number of {x, y} pairs.

In some cases, while modeling a time-series, not all the scalar values in the time-series are weighted equally. For example, more recent time-series data values found in the historical data are given a higher weight as compared to older ones. Various shapes of weights to overlay a time-series are possible, and one exemplary shape is the shape of an exponentially decaying model.

Use of exogenous variables might involve considering seasonality factors or other factors that are hypothesized to impact, or known to impact, the measured responses. For example, suppose the notion of seasonality is defined using quarterly time graduations. And the measured data shows only one quarter (e.g., the $4^{th}$ quarter) from among a sequence of four quarters in which a significant deviation of a certain response is present in the measured data. In such a case, the exogenous variables 57 can define a variable that lumps the $1^{st}$ through $3^{rd}$ quarters into one variable and the $4^{th}$ quarter in a separate variable.

Further details of a top down predictive model are described in U.S. application Ser. No. 14/145,625 entitled, "MEDIA SPEND OPTIMIZATION USING CROSS-CHANNEL PREDICTIVE MODEL", filed Dec. 31, 2013, the contents of which are incorporated by reference in its entirety in this Application.

Other operations, transactions, and/or activities associated with the data processing system are possible. Specifically, the subject users 780 can receive a plurality of online message data 753 transmitted through any of a plurality of online delivery paths 776 (e.g., online display, search, mobile ads, etc.) to various computing devices (e.g., desktop device $782_1$, laptop device $782_2$, mobile device $782_3$, and wearable device $782_4$). The subject users 780 can further receive a plurality of offline message data 752 presented through any of a plurality of offline delivery paths 778 (e.g., TV, radio, print, direct mail, etc.). The online message data 753 and/or the offline message data 752 can be selected for delivery to the subject users 780 based in part on certain instances of campaign specification data records 774 (e.g., established by the advertisers and/or the analytics computing platform 730). For example, the campaign specification data records 774 might comprise settings, rules, taxonomies, and other information transmitted electronically to one or more instances of online delivery computing systems 746 and/or one or more instances of offline delivery resources 744. The online delivery computing systems 746 and/or the offline delivery resources 744 can receive and store such electronic information in the form of instances of computer files $784_2$ and computer files $784_3$, respectively. In one or more embodiments, the online delivery computing systems 746 can comprise computing resources such as an online publisher website server 762, an online publisher message server 764, an online marketer message server 766, an online message delivery server 768, and other computing resources. For example, the message data record $770_1$ presented to the subject users 780 through the online delivery paths 776 can be transmitted through the communications links of the data processing system as instances of electronic data records using various protocols (e.g., HTTP, HTTPS, etc.) and structures (e.g., JSON), and rendered on the computing devices in various forms (e.g., digital picture, hyperlink, advertising tag, text message, email message, etc.). The message data record $770_2$ presented to the subject users 780 through the offline delivery paths 778 can be transmitted as sensory signals in various forms (e.g., printed pictures and text, video, audio, etc.).

The analytics computing platform 730 can receive instances of an interaction event data record 772 comprising certain characteristics and attributes of the response of the subject users 780 to the message data record $770_1$, the message data record $770_2$, and/or other received messages. For example, the interaction event data record 772 can describe certain online actions taken by the users on the computing devices, such as visiting a certain URL, clicking a certain link, loading a web page that fires a certain advertising tag, completing an online purchase, and other actions. The interaction event data record 772 may also include information pertaining to certain offline actions taken by the users, such as purchasing a product in a retail store, using a printed coupon, dialing a toll-free number, and other actions. The interaction event data record 772 can be transmitted to the analytics computing platform 730 across the communications links as instances of electronic data records using various protocols and structures. The interaction event data record 772 can further comprise data (e.g., user identifier, computing device identifiers, timestamps, IP addresses, etc.) related to the users and/or the users' actions.

The interaction event data record 772 and other data generated and used by the analytics computing platform 730 can be stored in one or more storage partitions 750 (e.g., message data store 754, interaction data store 755, campaign metrics data store 756, campaign plan data store 757, subject user data store 758, etc.). The storage partitions 750 can comprise one or more databases and/or other types of non-volatile storage facilities to store data in various formats and structures (e.g., data tables 782, computer files 784₁, etc.). The data stored in the storage partitions 750 can be made accessible to the analytics computing platform 730 by a query processor 736 and a result processor 737, which can use various means for accessing and presenting the data, such as a primary key index 783 and/or other means. In one or more embodiments, the analytics computing platform 730 can comprise a performance analysis server 732 and a campaign planning server 734. Operations performed by the performance analysis server 732 and the campaign planning server 734 can vary widely by embodiment. As an example, the performance analysis server 732 can be used to analyze the messages presented to the users (e.g., message data record 770₁ and message data record 770₂) and the associated instances of the interaction event data record 772 to determine various performance metrics associated with a marketing campaign, which metrics can be stored in the campaign metrics data store 756 and/or used to generate various instances of the campaign specification data records 774. Further, for example, the campaign planning server 734 can be used to generate marketing campaign plans and associated marketing spend apportionments, which information can be stored in the campaign plan data store 757 and/or used to generate various instances of the campaign specification data records 774. Certain portions of the interaction event data record 772 might further be used by a data management platform server 738 in the analytics computing platform 730 to determine various user attributes (e.g., behaviors, intent, demographics, device usage, etc.), which attributes can be stored in the subject user data store 758 and/or used to generate various instances of the campaign specification data records 774. One or more instances of an interface application server 735 can execute various software applications that can manage and/or interact with the operations, transactions, data, and/or activities associated with the analytics computing platform 730. For example, a marketing manager might interface with the interface application server 735 to view the performance of a marketing campaign and/or to allocate media spend for another marketing campaign.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A computer-implemented method for generating attribution from fragmented user engagement stacks, comprising:
    storing, in a computer platform, a plurality of fragmented user engagement stacks of a plurality of touchpoint encounters and response data for the touchpoint encounters, wherein the touchpoint encounters comprise a plurality of attributes that characterize exposure of a plurality of messages transmitted through a network to a plurality of devices common to a single user, and the attributes comprise a universal unique identifier (UUID);
    storing, in the computer platform, at least one cross-device mapping data record, derived at least in part through at least one shared characteristic between two or more devices, that associates the UUIDs of at least two devices to a single user;
    processing, in the computer platform, using the cross-device mapping data record, to identify at least two of the UUIDs from different devices associated with a single user and to join at least two touchpoint encounters from the single user that originated from the different devices so as to generate at least one cross-device user engagement stack;
    generating a touchpoint response predictive model using cross-device user engagement stacks including the cross-device user engagement stack; and
    generating, in the computer platform, using the touchpoint response predictive model, the cross-device user engagement stack, and the response data, attribution of the touchpoint encounters to responses to the messages based at least in part on a measure of an influence attributed to a respective touchpoint encounter in the cross-device user engagement stack, wherein the attribution attributes a first portion of the attribution of a first response to a first touchpoint for a first device in the cross-device user engagement stack and a second portion of the attribution for the first response to a second device in the cross-device user engagement stack, wherein first response is a conversion that occurred on the second device.

2. The computer-implemented method as set forth in claim 1, wherein the messages exposed to a plurality of users comprise notification messages associated with an Internet of Things system.

3. The computer-implemented method as set forth in claim 1, wherein the messages exposed to a plurality of users comprise marketing messages deployed across a plurality of media channels.

4. The computer-implemented method as set forth in claim 1, wherein generating, in the computer platform, using the cross-device user engagement stack, attribution to responses to the messages comprises generating, in the computer platform, attribution to responses that measure a transition of the user from a first engagement state to a second engagement state.

5. The computer-implemented method as set forth in claim 1, wherein generating, in the computer platform, using the cross-device user engagement stack, attribution to responses to the messages comprises generating, in the computer platform, at least one metric comprising of at least one of, a number of impressions, a number of clicks, a number of conversions, a number of true conversions, a CPA, a true CPA, a reach, or a lift.

6. The computer implemented method of claim 1, wherein the shared characteristic between two or more devices comprises at least one of, login information, connection IP addresses, Wi-Fi networks used, websites visited, or any combination thereof.

7. The computer implemented method of claim 1, further comprising generating the cross-device mapping data record using at least one of a deterministic matching or a probabilistic matching technique.

8. The computer implemented method of claim 1, wherein generating, in the computer platform, using the cross-device user engagement stack and the response data, attribution to responses to the messages comprises:
storing, in a computer, response data for the touchpoint encounters that measures an effectiveness of the messages; and
training, using machine-learning techniques in a computer, the cross-device user engagement stack with the response data to generate the touchpoint response predictive model.

9. A computer readable medium, embodied in a non-transitory computer readable medium, the non-transitory computer readable medium having stored thereon a sequence of instructions which, when stored in memory and executed by a processor causes the processor to perform a set of acts, the acts comprising:
storing, in a computer platform, a plurality of fragmented user engagement stacks of a plurality of touchpoint encounters and response data for the touchpoint encounters, wherein the touchpoint encounters comprise a plurality of attributes that characterize exposure of a plurality of messages transmitted through a network to a plurality of devices common to a single user, and the attributes comprise a universal unique identifier (UUID);
storing, in the computer platform, at least one cross-device mapping data record, derived at least in part through at least one shared characteristic between two or more devices, that associates the UUIDs of at least two devices to a single user;
processing, in the computer platform, using the cross-device mapping data record, to identify at least two of the UUIDs from different devices associated with a single user and to join at least two touchpoint encounters from the single user that originated from the different devices so as to generate at least one cross-device user engagement stack;
generating a touchpoint response predictive model using cross-device user engagement stacks including the cross-device user engagement stack; and
generating, in the computer platform, using the touchpoint response predictive model, the cross-device user engagement stack, and the response data, attribution of the touchpoint encounters to responses to the messages based at least in part on a measure of an influence attributed to a respective touchpoint encounter in the cross-device user engagement stack, wherein the attribution attributes a first portion of the attribution of a first response to a first touchpoint for a first device in the cross-device user engagement stack and a second portion of the attribution for the first response to a second device in the cross-device user engagement stack, wherein first response is a conversion that occurred on the second device.

10. The computer readable medium as set forth in claim 9, wherein the messages exposed to a plurality of users comprise notification messages associated with an Internet of Things system.

11. The computer readable medium as set forth in claim 9, wherein the messages exposed to a plurality of users comprise marketing messages deployed across a plurality of media channels.

12. The computer readable medium as set forth in claim 9, wherein generating, in the computer platform, using the cross-device user engagement stack, attribution to responses to the messages comprises generating, in the computer platform, attribution to responses that measure a transition of the user from a first engagement state to a second engagement state.

13. The computer readable medium as set forth in claim 9, wherein generating, in the computer platform, using the cross-device user engagement stack, attribution to responses to the messages comprises generating, in the computer platform, at least one metric comprising of at least one of, a number of impressions, a number of clicks, a number of conversions, a number of true conversions, a CPA, a true CPA, a reach, or a lift.

14. The computer readable medium of claim 9, wherein the shared characteristic between two or more devices comprises at least one of, login information, connection IP addresses, Wi-Fi networks used, websites visited, or any combination thereof.

15. The computer readable medium of claim 9, further comprising generating the cross-device mapping data record using at least one of a deterministic matching or a probabilistic matching technique.

16. The computer readable medium of claim 9, wherein generating, in the computer platform, using the cross-device user engagement stack and the response data, attribution to responses to the messages comprises:
storing, in a computer, response data for the touchpoint encounters that measures an effectiveness of the messages; and
training, using machine-learning techniques in a computer, the cross-device user engagement stack with the response data to generate the touchpoint response predictive model.

17. A system comprising:
a storage medium, having stored thereon, a sequence of instructions;
at least one processor, coupled to the storage medium, that executes the instructions to cause the processor to perform a set of acts comprising:
storing, in a computer platform, a plurality of fragmented user engagement stacks of a plurality of touchpoint encounters and response data for the touchpoint encounters, wherein the touchpoint encounters comprise a plurality of attributes that characterize exposure of a plurality of messages transmitted through a network to a plurality of devices common to a single user, and the attributes comprise a universal unique identifier (UUID);
storing, in the computer platform, at least one cross-device mapping data record, derived at least in part through at least one shared characteristic between two or more devices, that associates the UUIDs of at least two devices to a single user;
processing, in the computer platform, using the cross-device mapping data record, to identify at least two of the UUIDs from different devices associated with a single user and to join at least two touchpoint encounters from the single user that originated from the different devices so as to generate at least one cross-device user engagement stack; and generating a touchpoint response predictive model using cross-device user engagement stacks including the cross-device user engagement stack; and generating, in the computer platform, using the touchpoint response predictive model, the cross-device user engagement stack, and the response data, attribution of the touchpoint encounters to responses to the messages based at least in part on a measure of an influence attributed to a respective touchpoint encounter in the cross-device user engagement stack, wherein the attribution attributes a first portion of the attribution of a first response to a first touchpoint for a first device in the cross-device user engagement stack and a second portion of the attribution for the first response to a second device in the cross-device user engagement stack, wherein first response is a conversion that occurred on the second device.

18. The system as set forth in claim 17, wherein the messages exposed to a plurality of users comprise notification messages associated with an Internet of Things system.

19. The system as set forth in claim 17, wherein the messages exposed to a plurality of users comprise marketing messages deployed across a plurality of media channels.

20. The system as set forth in claim 17, wherein generating, in the computer platform, using the cross-device user engagement stack, attribution to responses to the messages comprises generating, in the computer platform, attribution to responses that measure a transition of the user from a first engagement state to a second engagement state.

* * * * *